Aug. 6, 1940.　　　J. H. GODFREY ET AL　　　2,210,366
CONGELATION AND AGITATION APPARATUS
Filed Feb. 11, 1937　　　11 Sheets-Sheet 1

Aug. 6, 1940.   J. H. GODFREY ET AL   2,210,366
CONGELATION AND AGITATION APPARATUS
Filed Feb. 11, 1937   11 Sheets-Sheet 2

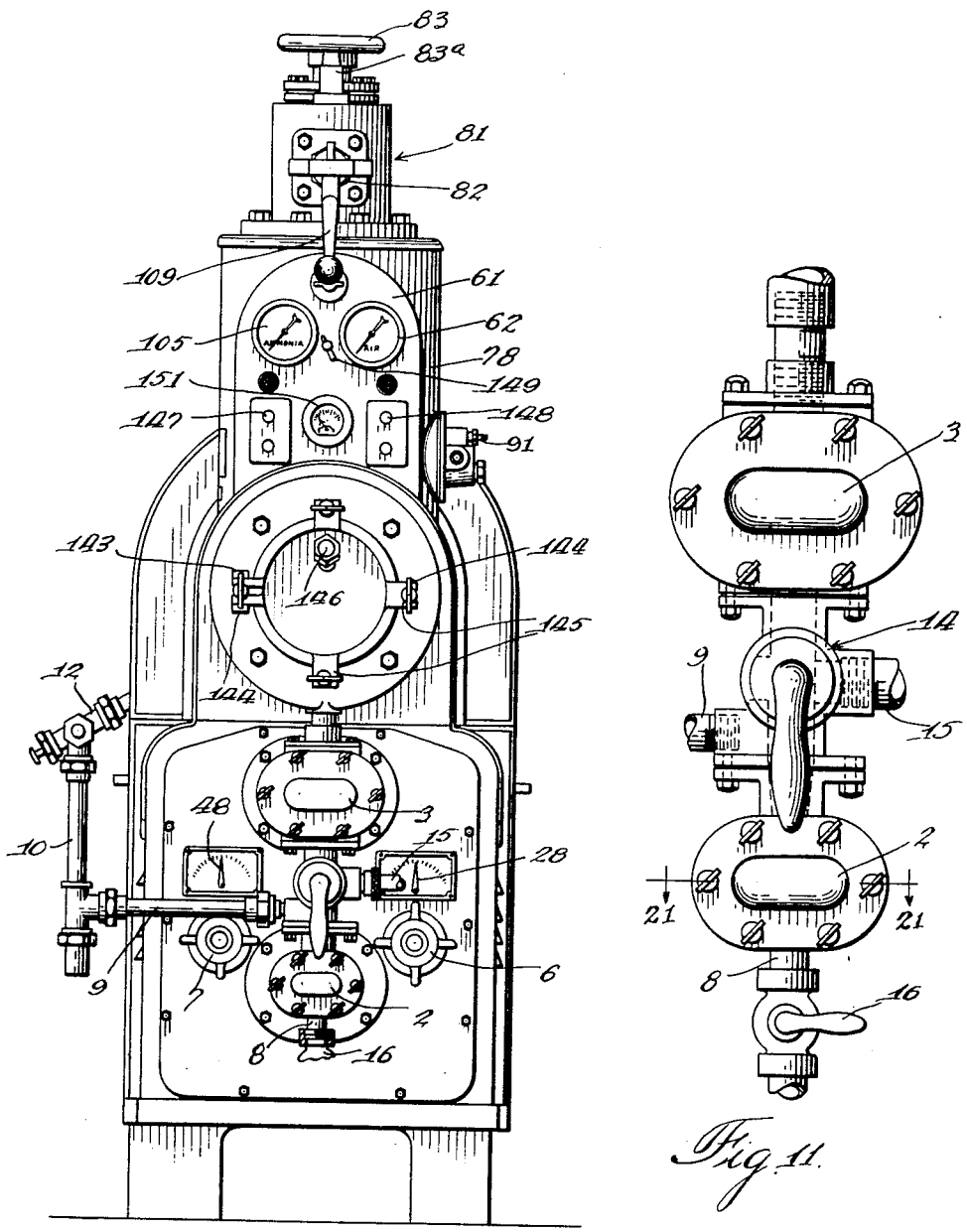

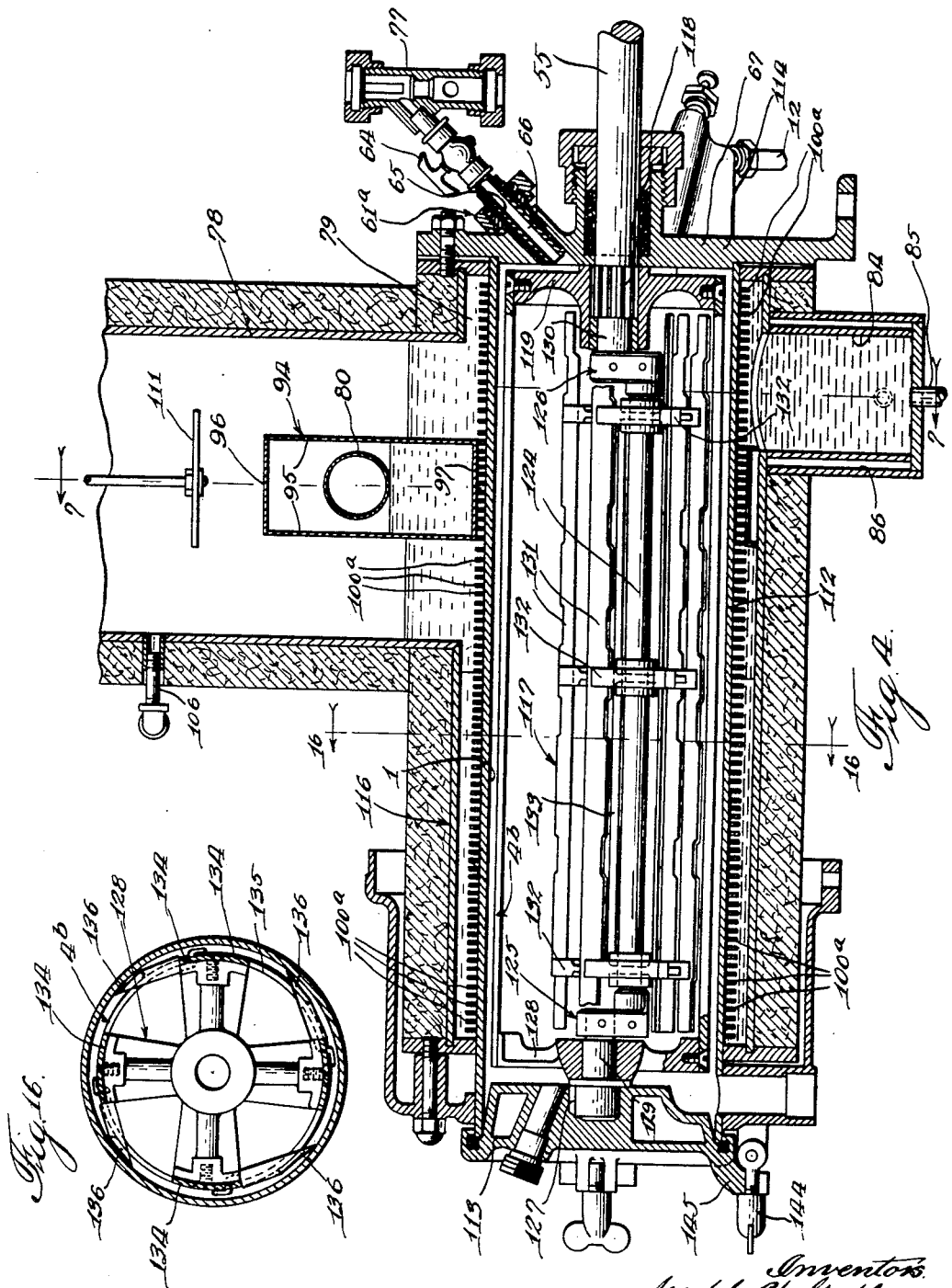

Aug. 6, 1940.   J. H. GODFREY ET AL   2,210,366
CONGELATION AND AGITATION APPARATUS
Filed Feb. 11, 1937   11 Sheets-Sheet 5
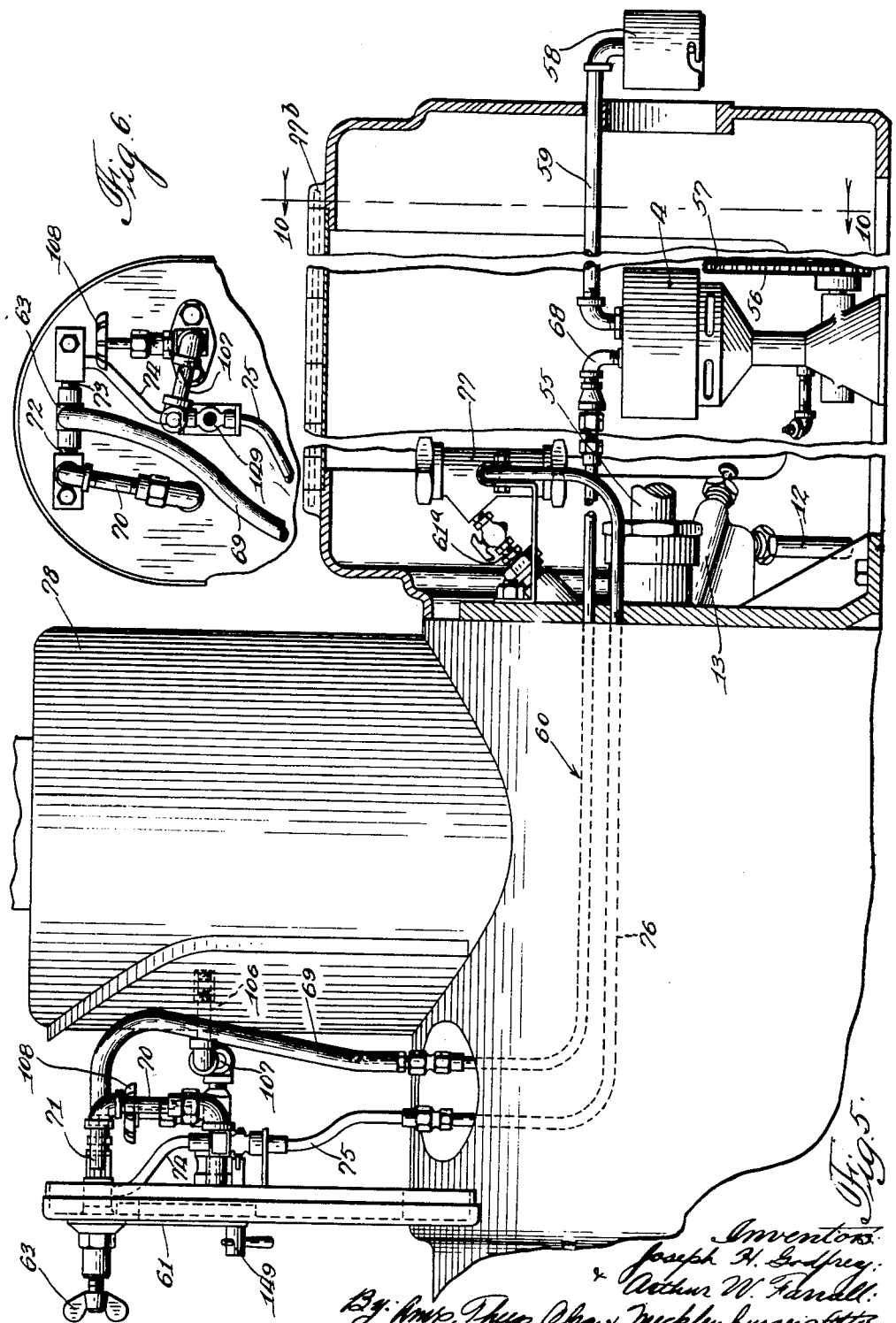

Aug. 6, 1940.　　　J. H. GODFREY ET AL　　　2,210,366
CONGELATION AND AGITATION APPARATUS
Filed Feb. 11, 1937　　　11 Sheets-Sheet 6
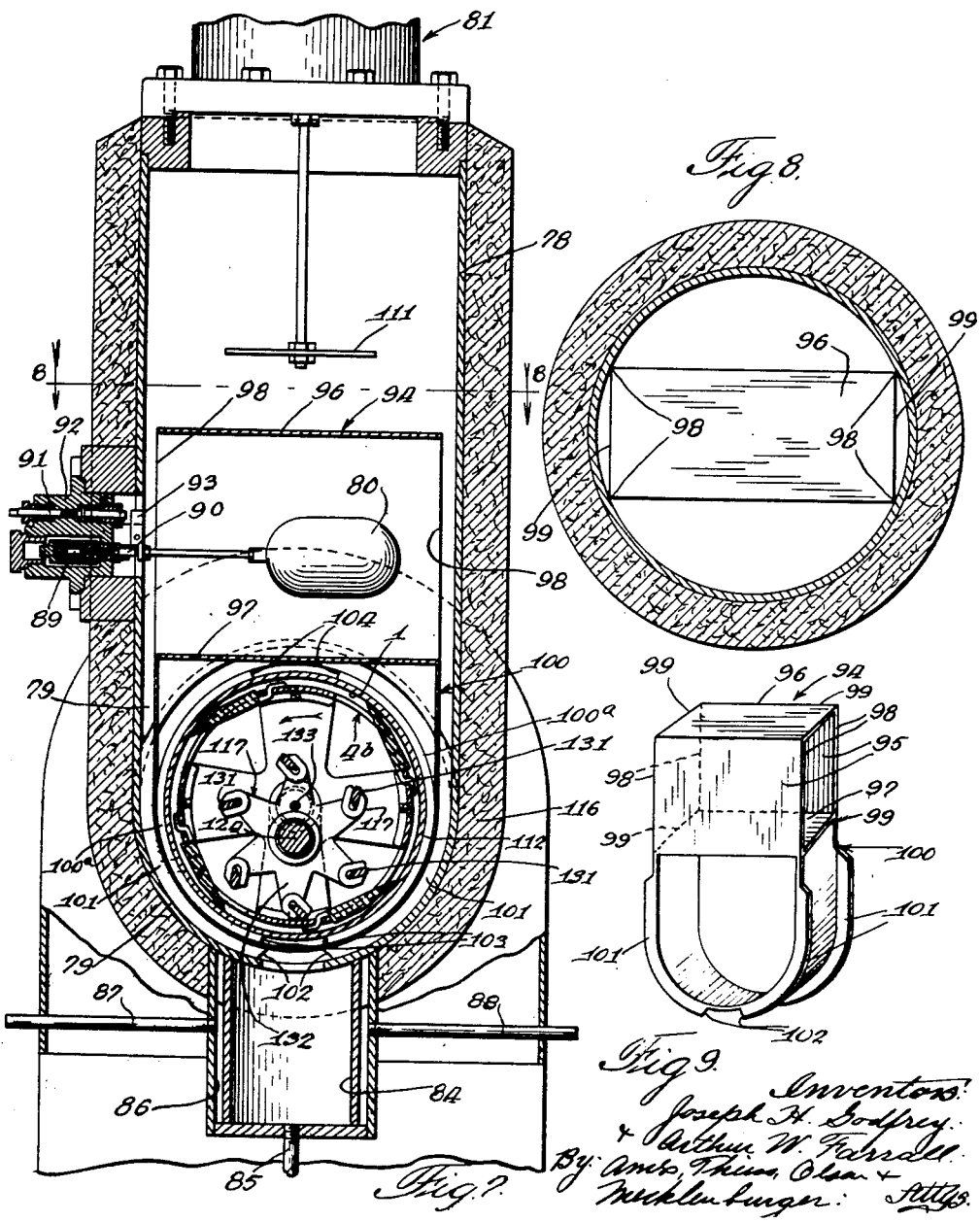

Aug. 6, 1940.   J. H. GODFREY ET AL   2,210,366
CONGELATION AND AGITATION APPARATUS
Filed Feb. 11, 1937    11 Sheets-Sheet 7

Inventors:
Joseph H. Godfrey
& Arthur W. Farrall
By Mrs, Thins, Olson & Mecklenburger Aug. 6, 1940.  J. H. GODFREY ET AL  2,210,366
CONGELATION AND AGITATION APPARATUS
Filed Feb. 11, 1937    11 Sheets-Sheet 8

Inventors
Joseph H. Godfrey
Arthur W. Farrall
By Amro, Theiss, Olson & Mecklenburger Attys.

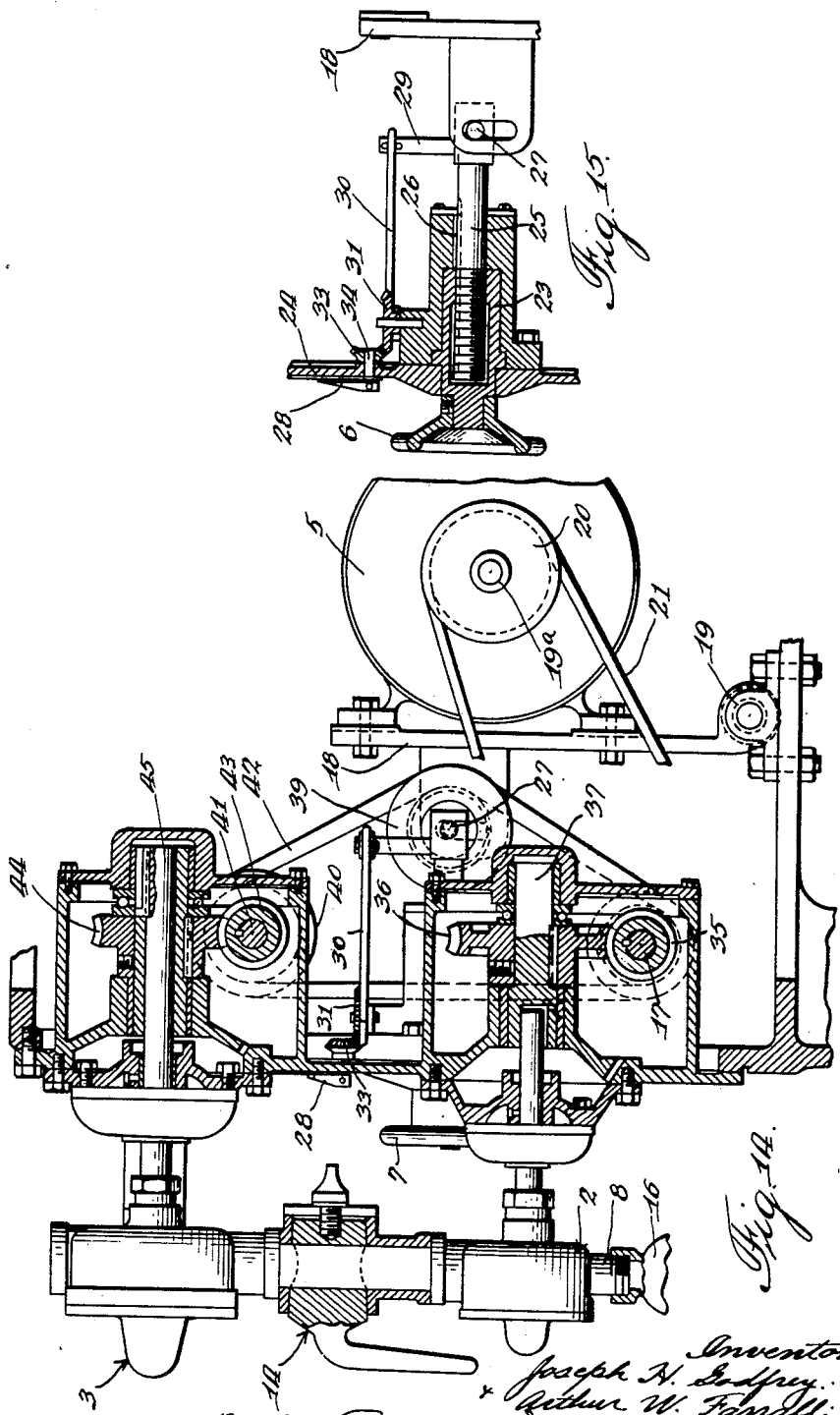

Aug. 6, 1940.   J. H. GODFREY ET AL   2,210,366
CONGELATION AND AGITATION APPARATUS
Filed Feb. 11, 1937   11 Sheets-Sheet 10
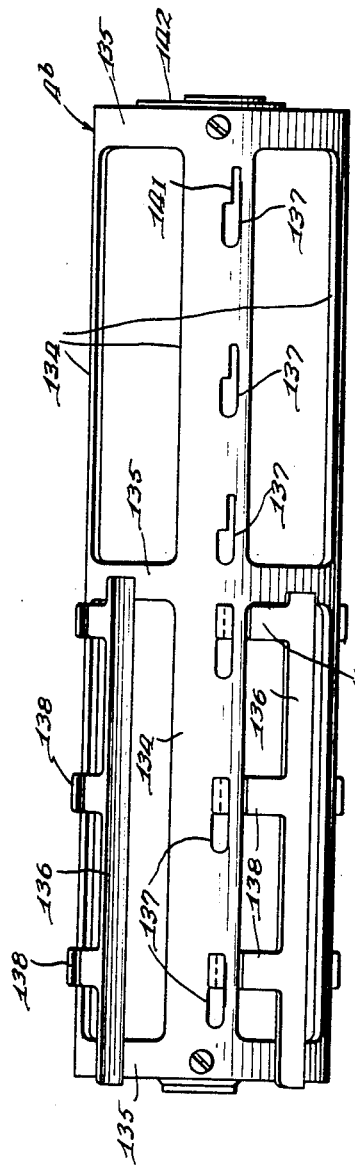
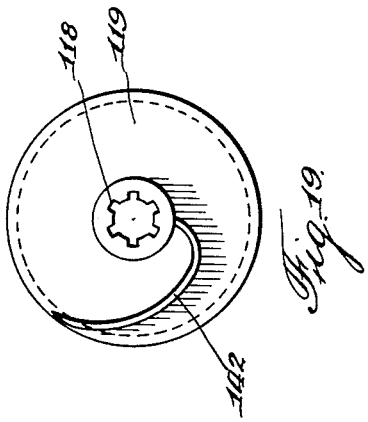
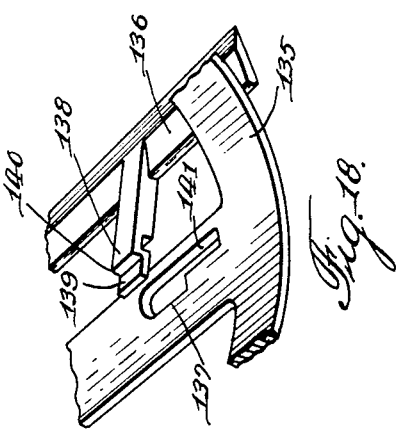

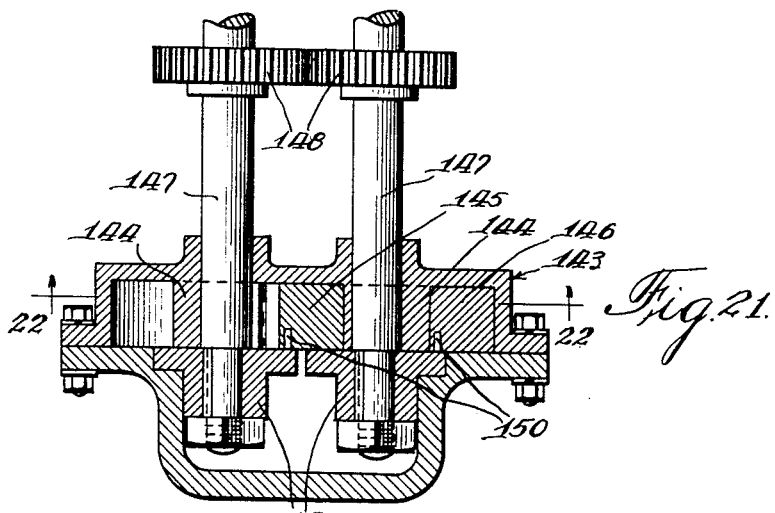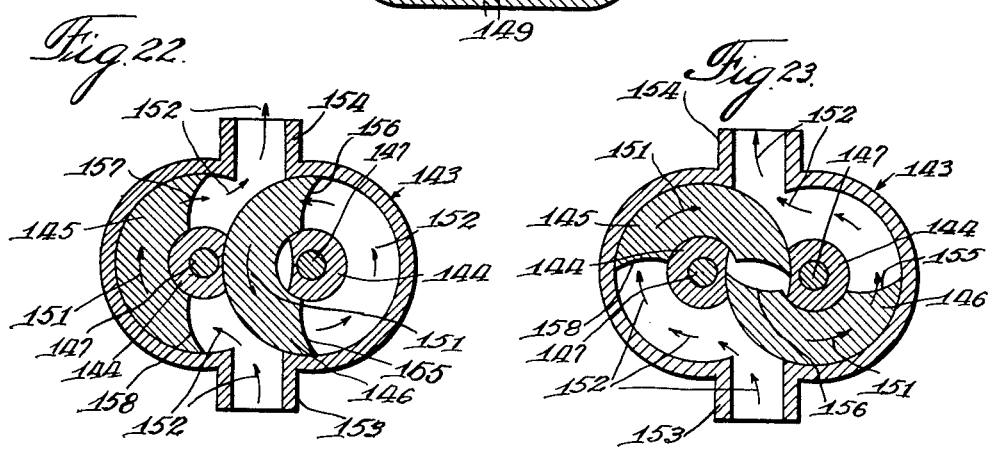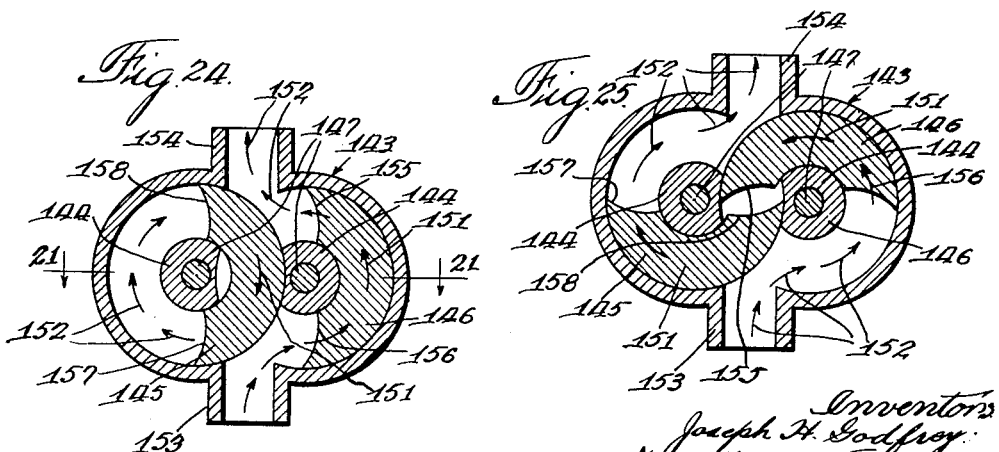

Patented Aug. 6, 1940

2,210,366

UNITED STATES PATENT OFFICE 2,210,366

CONGELATION AND AGITATION APPARATUS

Joseph H. Godfrey, Elmhurst, and Arthur W. Farrall, Wilmette, Ill., assignors to The Creamery Package Mfg. Company, Chicago, Ill., a corporation of Illinois Application February 11, 1937, Serial No. 125,242
In Great Britain May 22, 1936

59 Claims. (Cl. 62—114)

Our invention relates to congelation and agitation apparatus. While the specific apparatus disclosed is in connection with the manufacture of ice cream and similar frozen or partially frozen confections or mixtures, some features of the invention have a wider application for use with other materials, such as the manufacture of lard, etc. While in its relation to the manufacture of ice cream and similar confections, in the processing of which refrigeration, agitation, and the incorporation of air or other gas is required, the continuous method of manufacture is disclosed, certain features and phases of the invention are of a broader application and are applicable to the batch type of ice cream freezer as well.

In the commercial manufacture of ice cream, certain qualities of structure and taste in the finished product and the uniform attainment of those qualities are very desirable as having especial appeal to the consumer of ice cream. A fine texture, neither salvy nor coarse to the taste, is one of those qualities. Another is that of good body, neither soggy nor frothy. Another is the characteristic flavor of rich cream, modified only by the fruit or other flavoring introduced.

Securing and retaining these qualities has been a problem with the ice cream manufacturer. Ice cream is a delicately balanced colloid, of normal milk ingredients, with sugar and flavoring. It has been the practice to add also relatively small quantities of other wholesome but abnormal to milk ingredients, in an effort to secure the desired texture and body, but this detracts from the characteristic cream taste. Our search into improved methods and means for processing ice cream, with the object of attaining in superior degree the above mentioned and other desirable qualities in the product, has disclosed to us that temperature, agitation, pressure, and time are critical factors in the processing of the delicately balanced colloidal mixture to attain a uniformly excellent product.

We have found that these factors must be varied in their interrelation to attain best results with different flavors and ingredient proportions, and that with the correct interrelation established for any given formula and condition, those factors must be precisely maintained to secure uniform results in the product. To meet the varying requirements met with in commercial ice cream manufacture, each of the factors affecting the quantity, temperature, density and texture of the product must be independently adjustable. Our invention provides for such adjustments and also provides novel and improved agitating, mixing and refrigerating means whereby uniformity of performance and increased efficiency are secured.

Among the objects of our invention are to provide improved agitating means, including a freely rotatable stirrer actuated solely by the movement of the material being treated for agitating the material.

Another object of our invention is to provide improvements in the refrigerating apparatus, making for efficiency and simplicity in construction.

A further object of our invention is to provide improved means for incorporating a gas in the material being treated.

A further object of our invention is to provide improved means for recirculating the material in starting up the apparatus.

Further objects and advantages of the invention will be apparent from the description and claims.

In the drawings, in which an embodiment of our invention is shown,

Fig. 3 is a front elevational view;

Fig. 4 is a vertical axial section through the freezing cylinder and refrigerant container;

Fig. 5 is a side elevational view, partly in section, showing part of the compressed air system and part of the refrigeration system;

Fig. 6 is a rear elevational view of the upper part of the instrument board;

Fig. 7 is a vertical, transverse, sectional view, substantially on the line 7—7 of Fig. 4;

Fig. 8 is a section substantially on the line 8—8 of Fig. 7;

Fig. 9 is a perspective view of a device for controlling the inlet flow of the refrigerant;

Fig. 11 is a front elevational view of the pumps for controlling the in-and-out flow of the material being processed;

Fig. 14 is a longitudinal, vertical, sectional view, substantially on the line 14—14 of Fig. 12, parts however being shown in elevation;

Fig. 15 is a vertical longitudinal sectional view showing the hand wheel for controlling the pump speed;

Fig. 16 is a section substantially on the line 16—16 of Fig. 4;

Fig. 17 is a detail view of the scraper-carrying cage with some of the scrapers removed;

Fig. 18 is a detail perspective view showing the manner in which the scraper blades are attached to the cage;

Fig. 19 is a view of the rear end of the scraper cage;

Figure 1:
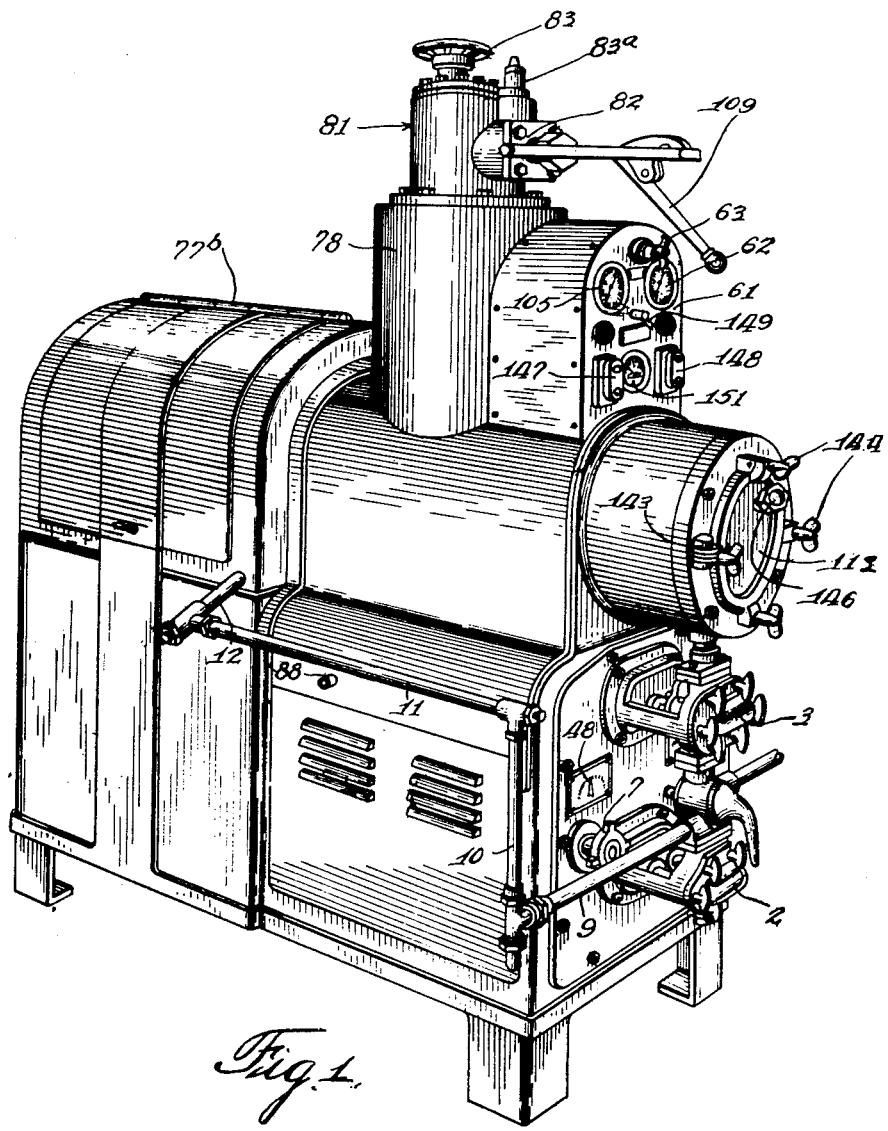
Figure 1 is a perspective view of the apparatus.

Fig. 21 is a horizontal section through one of the pumps, substantially on the line 21—21 of Fig. 11; and Figs. 22, 23, 24 and 25 are vertical sections substantially on the line 22—22 of Fig. 21, but showing the pump rotors in different positions.

The construction disclosed includes apparatus for congealing a liquid, agitating and breaking up the congealed product into a plastic mass, and incorporating a gas in the plastic congealed mass. More specifically, the apparatus shown comprises a freezing chamber 1, variable speed feed pump 2 for supplying liquid mix to the freezing chamber, a variable speed pump 3 for regulating the delivery of the plastic mass from the freezing chamber, a compressor 4 supplying gas under pressure to said chamber, a motor 4a for driving the scraper cage 4b and compressor 4, a motor 5 for driving said supply pump 2 and delivery regulating pump 3, and means for controlling the speed of said supply pump and delivery regulating pump comprising a hand-wheel 6 whereby the speed ratio both of the supply pump and of the delivery regulating pump with respect to the motor may be varied without changing the speed ratio of the delivery regulating pump with respect to the supply pump, and a hand-wheel 7 whereby the speed ratio of the delivery regulating pump with respect to the supply pump may be varied.

*Mix circulation. (See Figs. 1, 2, 3, 5, 10, and 11)*

Figure 10:
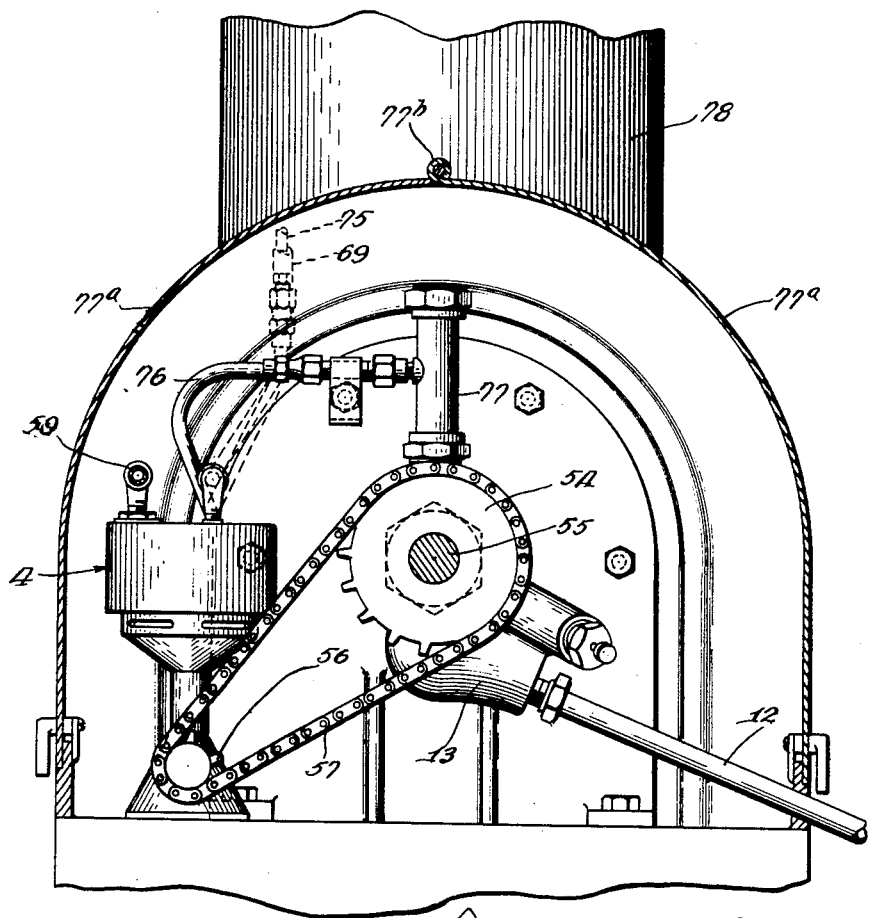
Fig. 10 is a vertical, transverse, sectional view, substantially on the line 10—10 of Fig. 5.
Figure 20:
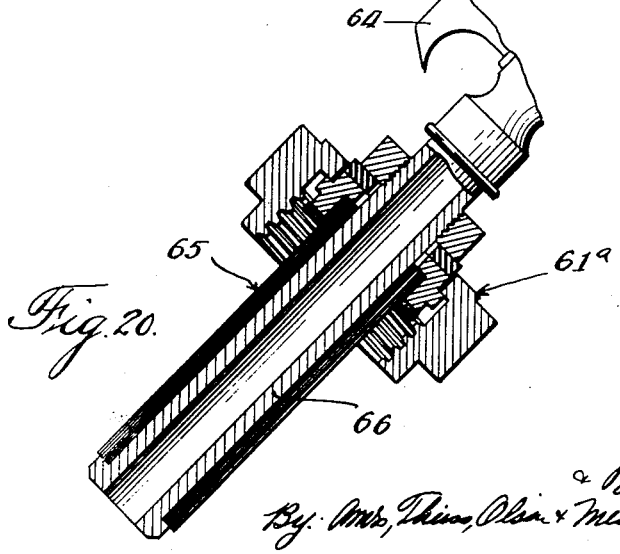
Fig. 20 is an enlarged sectional view of the air inlet to the freezing cylinder.

The liquid mix is supplied to the mix feed pump 2 from any suitable reservoir (not shown) communicating with the inlet 8 of the feed pump. From the discharge side of the pump, the mix is forced into the freezing cylinder through the pipes 9, 10, 11, and 12 leading to the mix inlet connection 13 at the rear end of the freezing cylinder (Figs. 1, 3, and 10). In the freezing chamber the mix is operated on by the scrapers and stirrer, compressed air being supplied from the compressor 4 at the desired pressure and the mixture being cooled and frozen by an ammonia refrigerating system, resulting in a commingling of the air with the mix along with the freezing of the mix. The pressure created by the inflow of the mix and compressed air causes the mixture to move forwardly in the freezing cylinder to the front or discharge end where its delivery is regulated by the variable speed pump 3. As the mixture in the freezing cylinder is subjected to a definite controllable pressure, the mixture in the freezing cylinder will be forced through the delivery regulating pump 3 up to the full capacity of this pump. From the delivery regulating pump, the mixture discharge pipe leads to a two-position, three-way valve 14 (Fig. 11), which, in one position, delivers the frozen mixture to a passage 15 leading to the containers to be filled and which valve in its other position will cause a recirculation of the mixture through the supply pipes 9, 10, 11, and 12 and the freezing cylinder 1.

This recirculation of the mixture through the freezing chamber may be necessary or desirable in starting up the freezing operation, in order to secure the desired consistency, percentage of overrun, temperature, etc., before delivering the mixture to the containers. Furthermore, the recirculation of the cooled material through the feed pipes 9, 10, 11, and 12 and through the rear head 67 of the freezing cylinder cools these parts down to the desired temperature preparatory to the ordinary running condition of the apparatus. When the delivery control valve is set to the full-line position shown in Fig. 11, recirculation will result. In this recirculation, the material flows from the delivery regulating pump 3 through the valve 14 to the pipes leading to the inlet feed in the rear end of the freezing cylinder. During this preliminary recirculation and refrigeration of the material, the valve 16 (Fig. 11) controlling the supply of mix to the mix supply pump 2 is shut off. This preliminary recirculation and refrigeration will be described more in detail hereinafter in connection with the operation of the apparatus.

*Variable speed pump drive and indicators. (Figs. 2, 12, 13, 14, and 15)*

In order to enable the capacity of the apparatus (that is to say, the number of gallons per hour of frozen mixture delivered) to be varied as desired without changing the percentage of overrun, and also for enabling the percentage of overrun to be regulated as desired, the mechanism shown in Figs. 12, 13, 14, and 15 is employed. Both the feed pump 2 and the delivery regulating pump 3 are driven from a single motor 5 through suitable manually controllable variable speed transmission, the transmission shown being in general of the Reeves type. This motor 5 drives a jack shaft 17 through a variable speed transmission. This jack shaft 17 is geared directly to the mix feed pump 2 so that the rate of mix supplied is directly proportional to the speed of the jack shaft. The delivery regulating pump 3 is driven from this jack shaft 17 through a suitable variable speed transmission so that the speed of the delivery regulating pump may be varied without varying the speed of the jack shaft. The hand wheel 6 is provided for controlling the speed of the jack shaft 17 with respect to the motor 5 and the other hand wheel 7 is provided for controlling the speed of the delivery regulating pump 3 with respect to the jack shaft 17. The motor 5 is rockably mounted by means of a bracket 18 (Figs. 2 and 14), the bracket being pivotally secured to the framework at 19. The motor shaft 19a has mounted thereon a two-part automatic variable speed pulley 20 over which runs a V-belt 21, which drives the pulley 22 on the jack shaft 17. The motor 5 may be rocked back and forth on its pivotal mounting by means of the manually operable hand-wheel 6, thus changing the distance of the motor shaft 19a from the jack shaft 17 and the distance between the two parts of the pulley 20. This changes the effective radius of this pulley 20 and varies the speed ratio of the jack shaft 17 with respect to the motor shaft 19a. The connections between the manually operable hand wheel 6 and the rockable motor support 18 comprise a sleeve 23 (Fig. 15) swiveled in the front of the frame 24, to which sleeve the hand wheel 6 is secured, a slide 25 splined in the front part of the frame at 26 and having a threaded connection with the swiveled sleeve 23, and a pin-and-slot connection 27 between this slide and the pivoted motor support 18. In order to indicate the speed ratio between the motor 5 and jack shaft 17 and thus indicate the speed of the mix feed pump, an indicator pointer 28 is pivotally mounted in the front of the frame, the position of this pointer being controlled by the position of the slide. The connection from this slide to the pointer (Figs. 13, 14, and 15) comprises a pin 29 extending upwardly from the slide 25, a link 30 pivotally connected with the pin 29, a bevel gear 31, an arm 32 movable with the bevel gear 31 and pivotally connected with the link 30, a bevel pinion 33 meshing with the bevel gear 31 and mounted in the front part of the frame, and a shaft 34 on which this bevel pinion 33 is mounted, on which shaft the indicator pointer 28 also is mounted.

The drive from the jack shaft 17 to the mix feed pump 2 comprises a worm 35 mounted on the jack shaft 17 and a worm wheel 36 driven from this worm 35 mounted on the shaft 37 which drives the mix pump.

Figures 12, 13:
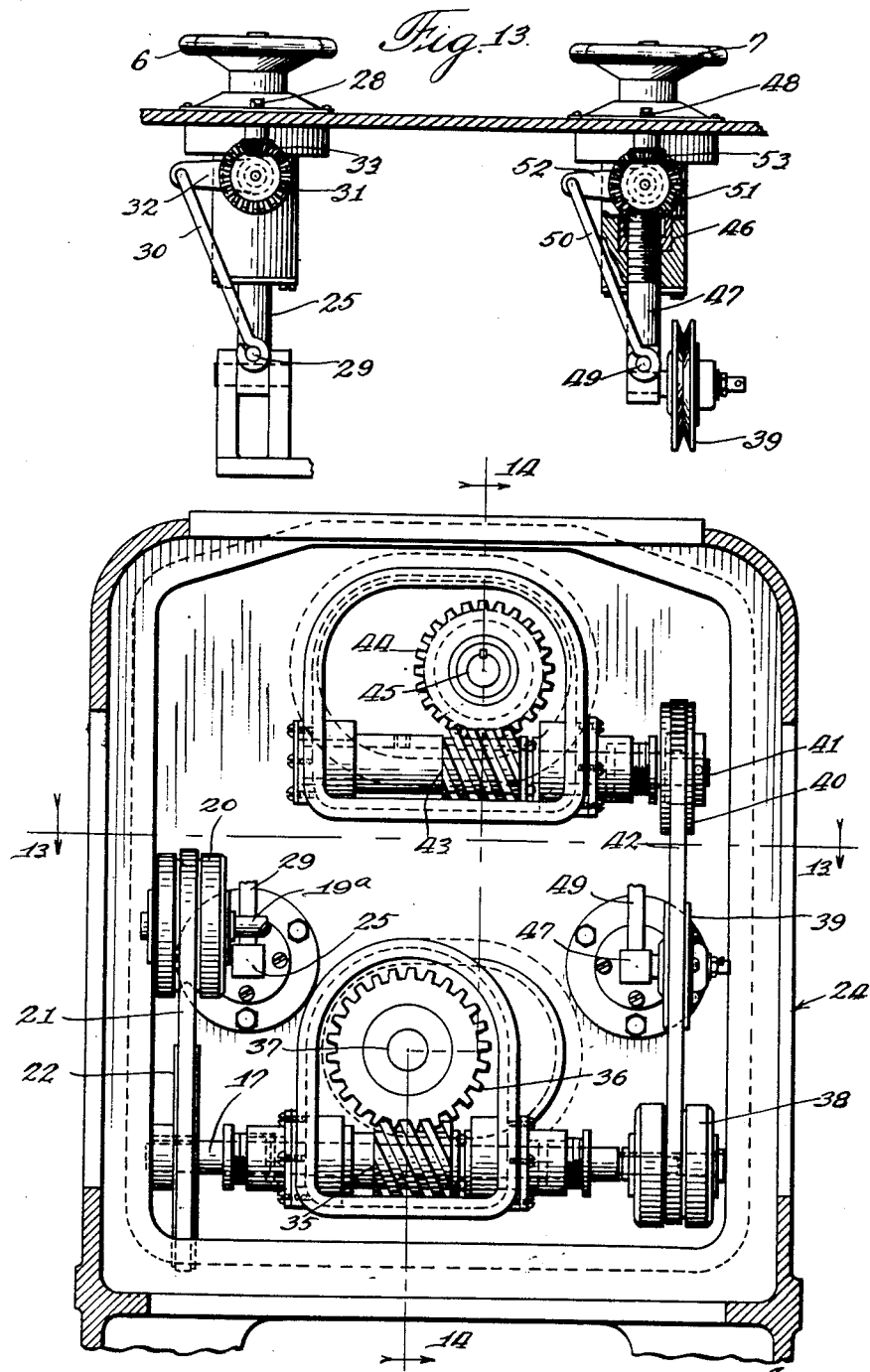
Fig. 12 is a section substantially on the line 12—12 of Fig. 2, showing the pump drive.
Fig. 13 is a horizontal sectional view substantially on the line 13—13 of Fig. 12, showing the speed indicators.

The variable speed drive from the jack shaft 17 to the delivery regulating pump 3 comprises a two-part automatic variable speed pulley 38 (similar to the automatic pulley 20 on the motor shaft), mounted on the jack shaft 17, a variable position idler 39, a pulley 40 mounted on a drive shaft 41, a V-belt 42 running over these three pulleys 38, 39, and 40, a worm 43 mounted on the drive shaft 41, and a worm wheel 44 meshing with the worm 43 and rotatable with the shaft 45 which drives the delivery regulating pump 3. By changing the position of the idler 39, the effective radius of the automatic two-part pulley 38 is changed, thus changing the speed ratio of the delivery regulating pump 3 with respect to the jack shaft 17. The connections from the manually operable handwheel 7, which controls the percentage of overrun, to the shiftable pulley 39 are similar to the connections between the other hand-wheel 6 and the rockable motor support 18 and comprise a sleeve 46 swiveled in the front of the frame on which the hand-wheel is mounted, and a slide 47 having a splined connection with the front of the frame and a threaded connection with the rotatable sleeve on which slide the idler pulley 39 is mounted, as shown in Fig. 13.

In order to indicate the percentage of overrun, a pointer 48 is provided, rotatably mounted in the front of the frame and connected with the idler carrying slide 47, by means of a pin 49 extending upwardly from this slide, a link 50 pivotally connected with this pin 49, a bevel gear 51 provided with an arm 52 movable therewith to which the link 50 is pivotally connected, a bevel pinion 53 meshing with this gear and a shaft on which this bevel pinion 53 is mounted and on which the overrun pointer 48 also is mounted.

Adjustment of the hand wheel 6 controls the amount of mix delivered to the freezing cylinder 1 and adjustment of the other hand wheel 7 controls in general the percentage of overrun, although the percentage of overrun can be still further modified by changing the pressure of the air delivered to the freezing cylinder.

It is obvious that the percentage of overrun may be varied as desired by changing the pressure of the air delivered to the freezing cylinder without making any adjustment of the handwheel 7, as an increase in the air pressure in the freezing cylinder will cause a corresponding increase in the expansion of the frozen mixture after it passes the delivery regulating pump 3.

*Compressed air supply and circulation*

The air compressor 4 may be of any suitable type driven from a sprocket wheel 54 on the dasher drive shaft 55 (Figs. 2, 5, and 10), which drives a sprocket wheel 56 on the drive shaft of the compressor by means of the sprocket chain 57. In order to insure a supply of pure air to the compressor, an air filter 58 of any suitable type is provided (Fig. 5) at the inlet end of the inlet pipe 59 leading to the compressor. The compressed air line 60 leads from the compressor 4 to the instrument panel 61 and back again to the air inlet 61a at the rear end of the freezing cylinder, suitable connections being provided at the instrument board to enable connection to be made with the air pressure indicator 62 on the front of the instrument panel, suitable connections also being provided for the manually adjustable pressure regulating valve 63 which controls the pressure of the air supplied to the freezing cylinder.

By adjusting the valve 63, the pressure in the freezing cylinder may be adjusted or varied as desired to secure the desired percentage of overrun.

The compressor itself runs at a speed which will cause an oversupply of air beyond the requirements of the freezing cylinder, a suitable relief valve being provided in the compressor to enable the escape of this oversupply. A suitable manually operable shut-off valve 64 is provided in the air line to the freezing cylinder for use in case it is necessary to open some part of the air line when the cylinder is full of mix.

In continuous pressure freezers, it has been found that the compressed air supply line is apt to freeze up, cutting off or restricting the air supply and interfering with the proper operation of the apparatus. We have overcome this difficulty by providing heat insulation means surrounding the air inlet tube leading through the rear end of the freezing cylinder. The heat insulation provided comprises a tubular member 65 (Fig. 4) of heat insulating material surrounding the metal inlet tube 66 leading through the rear end of the freezing cylinder. The heat insulation provided prevents any metal-to-metal heat path from the rear head 67 of the freezing cylinder to the metal pipe 66.

The compressed air connection from the compressor to the pressure regulating valve comprises a pipe 60 leading from the outlet connection 68 of the compressor to a flexible tube 69 connected at one end with this pipe 60 and at the other end with the inlet to the pressure regulating valve 63. The connection to the air pressure indicator 62 on the front of the instrument panel 61 is from a pipe 70 connected with the outlet side of the pressure regulating valve 63 through the pipes 71 and 72 and suitable pipe connections. The connection from the pressure regulating valve 63 to the freezing cylinder 1 is from a pipe 73 leading from the outlet side of the pressure regulating valve 63 through the pipes 74, 75, and 76, and suitable fittings to the fitting 77 at the rear end of the freezing cylinder to which the air inlet 61a is connected. This fitting 77 includes a trap which cooperates with a check valve to prevent mix from backing up into the air line.

Suitable doors or covers 77a (Fig. 10) are provided to afford access to the air compressor and the rear end of the freezing cylinder, these covers being mounted to swing about a common hinge 77b. Suitable doors are provided in the framework to afford access to the motors and pump drive when desired.

*Refrigeration system. (Figs. 4, 7, 8 and 9)*

The refrigeration system shown is of the direct expansion ammonia type, the liquid ammonia being maintained at a level above the upper part of the freezing cylinder 1. A dome 78 is provided extending upwardly from the refrigeration chamber 79 for receiving the gasified ammonia from the refrigeration cylinder and providing a chamber for the reception of the float 80 and the ammonia deflecting and separating apparatus, a valve casing 81 being provided on the upper part of the dome and in communication therewith for the manually operable quick shut-off valve 82 and for the manually adjustable ammonia gas pressure regulating valve 83. The back pressure regulating valve 83 may be of the general type shown in the patent to Scovel, Jr., No. 1,831,468, dated November 10, 1931. When this back pressure regulating valve 83 is adjusted, it will maintain a substantially constant temperature of the mixture delivered from the freezing cylinder, regardless of ordinary changes in temperature of the mix supplied and the rate of supply and discharge of the mix, since increase either in temperature or rate of supply of the mix will cause an increase in the rate of gasification of the ammonia and a consequent increase in the rate of flow of the ammonia gas past the pressure regulating valve 83. A safety relief valve 83a is provided to prevent excessive pressure. An oil trap chamber 84 extends downwardly from the rear end of the refrigeration cylinder, having a drain pipe 85 through which any trapped oil may be drawn off.

In order to thaw out the freezing cylinder quickly in case of an emergency, a steam jacket 86 is provided surrounding the downwardly extending oil trap having steam inlet and outlet pipes 87 and 88, respectively, extending to opposite sides of the apparatus by means of which steam may be passed through the steam chamber when desired, causing a quick thawing action of the freezing cylinder.

The specific float valve construction shown is a well known type, but it is, however, combined in a novel way with other parts of the apparatus. This float valve construction shown comprises a valve 89 opened by a lowering movement of the float 80 compressing the valve closing spring and closed by a rising movement of the float, which permits the spring to close the valve so that the liquid level in the refrigerant dome is maintained substantially constant. A shut-off valve 90 also is provided in the line leading to the refrigerant dome 78, which may be closed by means of a manually operable stem 91 threaded in the valve fitting 92 and bearing against the fulcrum block 93 on which the float 80 is mounted. Screwing this stem 91 inwardly forces the shut-off valve 90 to its seat and thus positively cuts off the supply of liquid ammonia to the refrigerant chamber.

Figure 2:
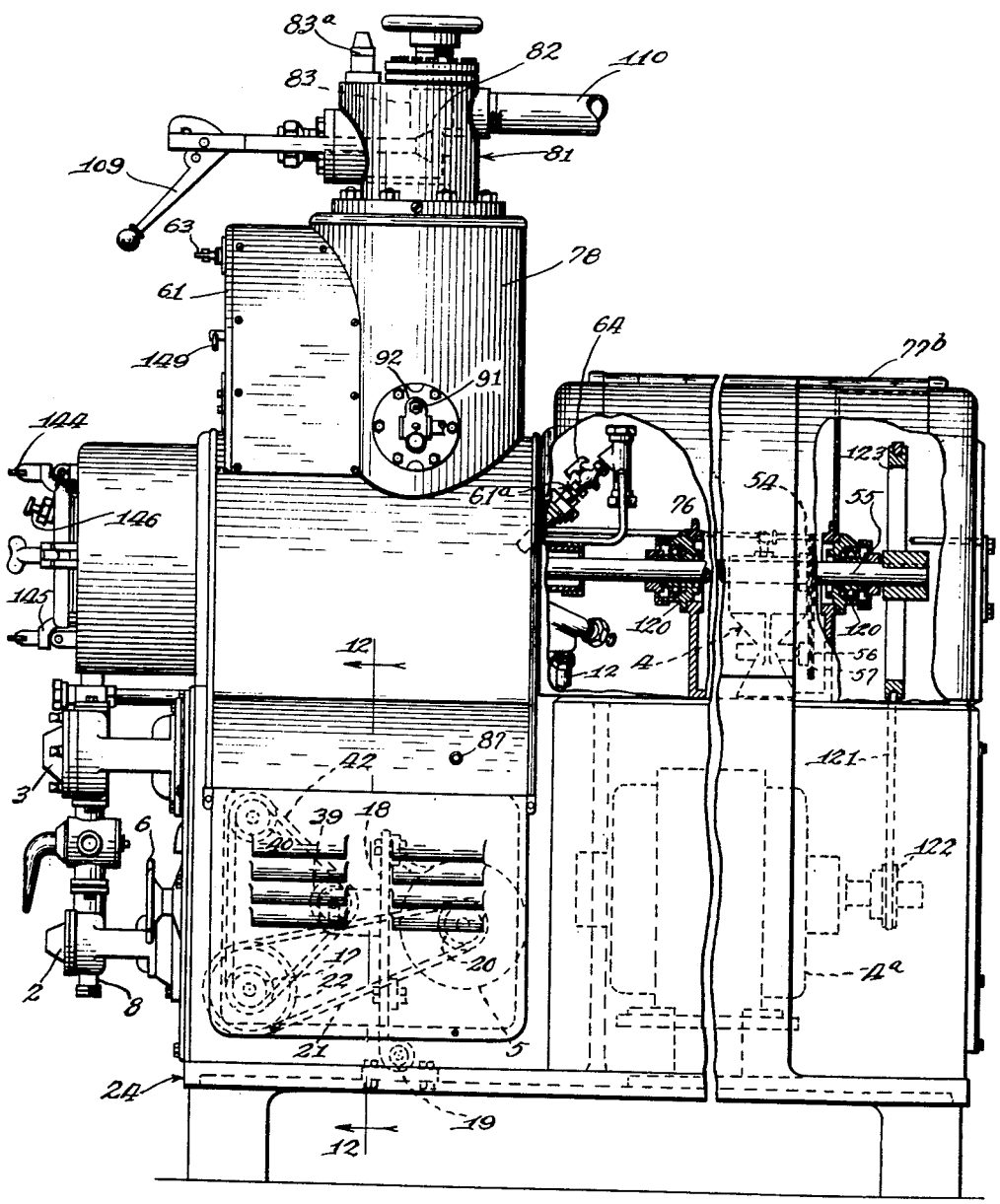
Fig. 2 is a side elevational view, parts being broken away to show the interior construction.

For preventing violent surging of the float 80 and for controlling the flow of ammonia from the float controlled valve 89 to the refrigerant cylinder, a box-like structure 94 is provided surrounding the float 80 and comprising two side walls 95, a top wall 96 and a bottom wall 97, the four vertical edges 98 of which box fit snugly against the walls of the refrigerant dome 78, the float valve operating in this rectangular box-like structure and the ammonia from the float valve entering this box-like structure in the form of a jet or spray. The four horizontal edges 99 of this box-like structure are spaced somewhat from the wall of the refrigerant dome, as best shown in Fig. 8, so that communication is provided between the horizontal cylindrical refrigerant cylinder 79, the box 94 and the upper part of the vertically extending ammonia gas dome. As the jet of liquid ammonia enters this box-like structure 94, a portion of it will be gasified and may escape upwardly into the ammonia gas dome above the box. The greater part of it, however, will strike against the walls of the box or of the dome and will flow downwardly from the box into the refrigerant cylinder. It is desirable that a substantial part of this liquid ammonia should be conducted immediately to the under side of the freezing cylinder and caused to flow therefrom longitudinally of the freezing cylinder. To aid in controlling the flow of ammonia, a channeled U-shaped member 100 is provided, which extends downwardly from the box structure 94, this U-shaped channel member snugly embracing the arcuate heat radiating fins 100a on the freezing cylinder 1 and having its side flanges 101 snugly engaging the inner lower surface of the refrigerant chamber 79, tending to confine the downward flow of ammonia to the space between these flanges. These flanges 101 are cut away at the bottom at 102 to enable the escape of the freshly entering ammonia and direct it longitudinally of the freezing cylinder 1. In order to facilitate the longitudinal flow of the ammonia along the freezing cylinder, the heat radiating fins 100a on the freezing cylinder may be cut away all along the bottom of the freezing cylinder, as indicated at 103 (Fig. 7). The heat radiating fins at the top of the cylinder may also be cut away all along the top of the cylinder to facilitate the flow of gasified ammonia through the liquid ammonia along the top of the cylinder to the ammonia gas dome, as indicated at 104. The temperature of the gasified ammonia may be accurately controlled and regulated by means of the manually adjustable pressure regulating valve 83 which may be set to give any desired pressure and hence any desired temperature to the gasified ammonia. A suitable ammonia pressure gauge 105 is provided on the instrument panel 61, a connection being provided from the ammonia gas dome to this indicator by means of the pipes 106 and 107 (Figs. 5 and 6) and suitable pipe connections. A shut-off valve 108 may be provided to cut off the pressure gauge 105 from the dome 78 in case of emergency. In order to stop the gasification of the ammonia in the refrigerant cylinder and hence stop the refrigeration action of the ammonia, the quick closing shut-off valve 82 is provided, this valve being in series with the pressure regulating valve, as shown in Fig. 2. This valve may be closed or opened quickly by means of the valve operating lever 109. From the outlet side of the pressure regulating valve 83, a pipe connection 110 (Fig. 2) leads to the compressor (not shown) which pumps the gasified ammonia from the ammonia dome 78 and forces it into the usual condenser (not shown), from which condenser the ammonia again in its liquid state is supplied to the refrigerant chamber 79 through the float controlled valve 89. In order to separate liquid ammonia which may be entrained in the gasified ammonia in the upper part of the dome 78, a horizontal separator plate 111 may be provided above the box 94.

Freezing cylinder and dasher

The cylinder and dasher construction shown in detail in Figs. 4, 7 and 16 comprises a cylindrical shell 112 closed by front and rear heads 113 and 114, respectively, to provide the freezing cylinder or chamber 1 to which the mix and compressed air are delivered and from which the mixture of frozen mix and air are delivered, a heat-insulating cylinder or jacket 116 surrounding the freezing cylinder and spaced therefrom to provide the annular refrigerant chamber 79 surrounding the freezing chamber 1 and forming part of the refrigerating system, the rotatable power-driven scraper-carrying cage 4b coaxial with the shell of the freezing cylinder, and a reaction stirrer 117 free to rotate in the interior of the scraper-carrying cage about an axis offset with respect to the axis of the scraper-carrying cage, this stirrer, however, not being power driven but rotated simply by the pressure exerted on it by the motion of the mixture in the freezing chamber. The scraper-carrying cage 4b is driven from the same motor 4a which drives the air compressor 4 by means of the shaft 55 coaxial with the scraper carrying cage and having a splined connection 118 with the rear head 119 of the cage. This shaft 55 is rotatably mounted in suitable anti-friction bearings 120 and driven from the motor 4a by means of a sprocket chain 121 running over a sprocket 122 on the motor shaft 123 and a sprocket 124 on the shaft 55. The free-moving rotatable stirrer 117 is mounted for free rotation within the cage on a shaft 124 extending substantially from one end to the other of the freezing cylinder, this shaft being suspended from a pair of stationary hangers 125 and 126 to which the shaft 124 is rigidly secured. These hangers 125 and 126 support the shaft 124 and the stirrer in a position eccentric with respect to the axis of the scraper cage 4b. In order to hold this stirrer-carrying shaft 124 against movement in the freezing cylinder, the front hanger 125 is held against rotation and as both hangers are rigidly secured to the stirrer-supporting shaft 124, the shaft will be held against movement in the freezing cylinder. The front hanger is held against rotation by means of a key connection 127 with the front head 113 of the freezing cylinder (Fig. 4). The front spider 128 of the scraper cage is rotatably mounted on a cylindrical portion 129 of this front hanger. The rear hanger 126 is centered and positioned with respect to the scraper cage 4b by means of a cylindrical portion 130 extending into the hub of the rear head 119 of the scraper cage.

The stirrer itself, shown in Figs. 4 and 7, comprises a plurality of stirrer bars 131 extending substantially from one end to the other of the freezing cylinder and mounted on three spiders 132, which spiders are freely rotatable on the stirrer-carrying shaft 124. In order to prevent the frozen mixture from accumulating on the stationary stirrer-carrying shaft 124, a rod 133 is provided extending through aligned openings in the stirrer spiders 132, this rod being adjacent the stirrer-carrying shaft 124, so that the movement of the rod 133 about the shaft 124 prevents any accumulation of frozen material on the shaft. The scraper cage construction comprises a plurality of scraper-carrying bars 134 (four being shown) extending substantially from one end to the other of the freezing cylinder and united at their ends and middle portions by circular bands 135, a plurality of scraper blades 136 (two for each of these bars), having a loose pivotal connection with the bars, respectively, and the front spider 128 and rear head 119 for the cage referred to above. The spider 128 and head 119 are firmly secured in any suitable manner to the front and rear bands 125, respectively. The loose pivotal connection of the scraper blades 136 with the scraper-carrying bars 134 is effected by means of keyhole slots 137 in the scraper-carrying bars engageable with the hook-like arms 138 on the scraper blades (Figs. 7, 17 and 18).

As shown in Figs. 17 and 18, the ends of the scraper blades 136 overlie the cylindrical bands 135, thus preventing the blades from falling toward the axis of the scraper cage. In assembling the scraper blades on the scraper-carrying bars, the blade is brought to the position substantially as shown in Fig. 18, in which the scraping part of the blade lies outside of the periphery of the cage, and the hook-like arm 138 extends into the interior of the cage with the extreme hook portion 139 opposite the enlarged portion of the keyhole slot 137. The scraper blade is then manipulated so as to cause the hook-like tip portion 139 of the arm 138 to swing through the enlarged portion of the keyhole slot. The blade is then shifted longitudinally to bring the offset portion 140 of the hook into the narrow portion 141 of the keyhole slot. Any suitable means may be provided for holding the scraper blades against endwise movement after they have been assembled on the cage. The assembly of parts might hold the scraper blades in position, as the left hand scraper blades of Fig. 17 will be held against endwise movement by the head of the freezing cylinder and the right hand blades will be held against longitudinal movement by engagement with the left hand scraper blades. Another method of holding the blades in assembled relation is to solder a filler piece in the enlarged portion of the keyhole slot after the blade is assembled on the cage.

In order to prevent frozen material from adhering to the rear end of the freezing cylinder and to give better distribution of air and mix, a spiral scraper blade 142 may be provided on the rear head of the cage, as shown in Figs. 17 and 19.

The action of the stirrer bars 131 in combination with the action of the scraper blades 136 prevents the formation of strata of different degrees of temperature in the mixture of air and mix in the freezing cylinder and thus insures the substantial uniform flow of the material in the freezing cylinder toward the discharge openings. If strata of partially frozen material of different temperatures were allowed to form, the strata of higher temperature would have greater fluidity and would tend to flow more easily under pressure than the strata of lower temperature and hence would be quicker in reaching the discharge opening. This might eventually result in clogging of the material in the freezing cylinder by the slow moving material of lower temperature and fluidity. The action of the stirrer, in combination with the scraper blades, results in a thorough commingling of the material in the freezing cylinder and prevents the formation of strata of different temperatures and thus causes a uniform flow of uniformly mixed material and prevents clogging of the material due to stratification.

Referring to Figs. 4, 7 and 17, it will be seen that the action of the scraper blades 136 is such as to tend to cause a rotary motion of the material in the freezing chamber which will act on the bars 131 of the stirrer, causing the stirrer to rotate in the same direction as the scraper blades are rotating. It will also be seen that the inner faces of the bars 131 of the stirrer will act on the material in the freezing chamber, tending to move this material toward the center. It will also be seen that due to the offsetting of the axis of the stirrer, the stirrer bars will be located at different distances from the axis of the freezing chamber so that some of the blades will act on the material remote from the axis of the freezing chamber and other blades will act on the material closer to the axis of the freezing cylinder, the result being that all of the material in the freezing chamber inside the orbit of the scraper blades 136 is stirred by the stirrer bars 131 and moved inwardly by the inner faces of the stirrer bars toward the axis of the freezing chamber.

The design of the pumps 2 and 3 is such that each rotation of the pump rotors will cause the passage through the pump of a definite volume of the material being handled, whether of the mix being fed to the freezing cylinder or of the mixture being discharged from the freezing cylinder. This has been found to be a decided advantage in accurately controlling the percentage of overrun and also in accurately controlling the capacity of the freezer. The construction of these pumps, shown in Figs. 21, 22, 23, 24, and 25, comprises a casing 143 provided with a pair of recessed cylindrical stub bearing members 144, a pair of flow-controlling rotors 145 and 146 rotatably mounted on said stub shafts, and means for driving these rotors in opposite directions. The means for driving the pump rotors comprises a pair of shafts 147 intergeared as indicated at 148 so as to rotate at the same speed but in opposite directions, rotatably mounted in the casing 143 and extending through the bearing members 144, and a pair of driving heads 149 keyed to the shafts 147, respectively, to rotate therewith and also secured to the rotors 144 and 145, respectively, to cause the rotation of the rotors when the shafts are rotated. For securing the rotors to the driving heads, each driving head may be provided with a pin 150 firmly secured thereto and extending into and fitting in a hole in the corresponding rotor. A pump of this general construction is shown in the patent to Bump, No. 1,294,869. The successive stages in the operation of the pump are indicated in Figs. 22, 23, 24 and 25, the direction of rotation of the rotors being indicated by the arrows 151 and the flow of the material being handled being indicated by the arrows 152. In Fig. 21 the position of the rotors 145 and 146 corresponds substantially to that shown in Fig. 24. Fig. 23 shows the rotors 90° farther along in their movement than in Fig. 22; Fig. 24 shows the rotors 90° farther along than in Fig. 23, and Fig. 25 shows the rotors 90° farther along than in Fig. 24. With this construction, it will be seen that there is never direct communication between the inlet 153 and outlet 154 of the pump casing and that all the material passing through the pump must flow into the pockets of the rotors and be ejected therefrom. As the rotors advance from the position shown in Fig. 22 to that shown in Fig. 23, the capacity of the left hand chamber, bounded by the rear edge of the rotor 145, the inside of the casing 143, and the outside of the bearing member 144, will be increased and will be filled with material supplied to the pump. The chamber on the right hand side of the pump defined by the edges 155 and 156 of the rotor will move from a position shown in Fig. 22, in which this chamber is completely enclosed, to the position shown in Fig. 23 in which material is being ejected from this chamber through the outlet 152. As the rotors pass from the position shown in Fig. 23 to that shown in Fig. 24, the chamber defined by the edges 157 and 158 of the left hand rotor 145 is completely shut off from the entrance and exit openings of the casings. In this movement the rotation of the right hand rotor 146 causes the ejection of the material through the outlet port 152 and causes the inflow of material from the inlet port 153. As the rotors rotate from the position shown in Fig. 24 to that shown in Fig. 25, the rotation of the left hand rotor 145 begins to cause the outflow of the material through the outlet port 154. The rotation of the right hand rotor 146 completes the ejection of the material by the front edge of the rotor 155 and causes the continued drawing in of the material through the inlet port. It will be seen that each rotation of the rotors causes the passage through the pump of a definite measured quantity of material.

From the foregoing, it will be seen that the capacity of the pumps will be substantially directly proportional to the speed of rotation of the rotors 145 and 146 so that the capacity of the pump can be varied by means of the hand wheel 6 without changing the percentage of overrun and the percentage of overrun can be varied by means of the hand wheel 7 without changing the quantity of mix being supplied to the freezer.

In the operation of the apparatus as a continuous ice cream freezer, there are two distinct and independent methods by which the overrun may be increased or decreased, as desired, and there is a third method which comprises the use of both of the first two methods, each in a lesser degree to accomplish the same results. These three methods for varying the overrun may be expressed as follows: (1) change the air pressure maintained in the freezing cylinder without changing the speed either of the supply pump or of the delivery regulating pump; (2) change the speed of the delivery regulating pump without changing the air pressure maintained in the freezing chamber and without changing the speed of the supply pump; and (3) change both the air pressure maintained in the freezing chamber and the speed of the delivery regulating pump without changing the speed of the supply pump.

Experience in the operation of the apparatus as an ice cream freezer discloses that the third method is effective and has the advantage of reducing the range of variation of discharge regulating pump speed necessary to provide the desired range of overrun control. Experience also demonstrates that the first method is sufficient for the control of overrun in a normal operation of the freezer but that it is sometimes advantageous to change the speed of the delivery regulating pump when changing from one ice cream mix to another of widely different characteristics or when making an extreme change in the percentage of overrun produced.

In further explanation of the theory involved, it is to be considered that in ice cream there are broadly two elements, mix and air. Liquid mix is not compressible to any degree which needs to be taken into consideration. As pressure is applied to the air in the freezing chamber, compression of the ice cream mix therein occurs wholly in the air content, not in the mix content.

If liquid mix is pumped into the freezing cylinder at a fixed rate and a fixed amount of mix under process is to be maintained in the freezing cylinder, ice cream must be discharged from the cylinder at a fixed rate in which the contained mix is being discharged from the chamber at exactly the same rate at which it is being pumped into the chamber. The weight of the air contained in the ice cream being negligible, this means that during any definite period of operation, the amount of mix, by weight or volume, discharged from the chamber is the same as the amount of mix, by weight or volume, pumped into the cylinder. It follows, therefore, that changes in air pressure without changing the speed of either pump does not vary the weight of the discharged ice cream, either per minute or per pump revolution. The only change effected is in the volume of the discharged ice cream, due to the changed relative amount of contained air at atmospheric pressure, due, in turn, to the changed degree of compression of the constant relative volume of air within the cylinder and the consequent changed degree of expansion of the air content in the ice cream when discharged to atmospheric pressure.

The quantity or volume ratio between mix and compressed air within the freezing cylinder is automatically stabilized at a fixed ratio for any given ratio between the speed of the supply pump and the speed of the delivery regulating pump within wide operating limits and without being affected by any changes in the air pressure. With the two pumps operating at constant speed relation, any increase of the relative amount of mix in the cylinder correspondingly reduces the amount of air present therewith and available to be whipped into the mix. Consequently, the increased relative amount of mix passing through the delivery regulating pump compared with the constant amount of mix being pumped in by the mix pump tends to reduce the quantity of mix within the cylinder. Conversely, any decrease in the relative amount of mix within the cylinder correspondingly increases the amount of air present for incorporation with the mix. The consequent decreased relative amount of mix passing through the delivery regulating pump tends to increase the quantity of mix within the chamber.

The opposing results of these two tendencies effects stabilization of the quantity ratio between the mix and air in the freezing chamber, which balances the rate of discharge of the mix from the cylinder at exactly the same rate at which mix is being pumped into the cylinder. If this were not so, continued operation would either fill the cylinder with mix to the exclusion of all air, or entirely exhaust the cylinder of all mix. Changes in pressure do not change this relation as obviously the whole mass within the cylinder is under like pressure, whether it be atmospheric, superatmospheric or subatmospheric.

The apparatus may be designed for use with various materials and may be built in various capacities. The apparatus shown is designed particularly for use with the manufacture of ice cream, the rated capacity of the apparatus being 150 gallons of frozen mixture delivered per hour, although this of course varies with the percentage of overrun, the material being processed, and other factors.

In the apparatus shown, the motor 4a for driving the dasher shaft 55 and air compressor 4 may be a 7½ H. P., 1170 R. P. M. motor. The speed of the dasher drive shaft 55 may be around 275 R. P. M. The motor 5 for driving the pumps 2 and 3 may be a 1 H. P., 1770 R. P. M. motor. The capacity of the mix feed pump 2 may be varied from 60 to 100 gallons per hour and the capacity of the delivery regulating pump 3 may be varied from 100 to 225 gallons per hour. The temperature of the mix delivered to the mix feed pump may vary from 60° F. to 30° F. and the temperature of the frozen mixture delivered may vary from 27° F. to 18° F. The temperature of the gasified ammonia may vary from 6° F. to 12° F. below zero, and lower if required.

The pressure of the air delivered to the freezing cylinder may vary from 0 to 40 lb. gauge pressure. In practice we obtain satisfactory results using an ammonia gas pressure of 9 lb. gauge (temperature 10° below zero), an air pressure of 22 lb. gauge, and a frozen mixture delivery temperature of 22° F.

The freezing cylinder for the capacity of freezer indicated may have a diameter of 8 inches and a length of 29 inches. The overrun may be varied from 0 per cent. to 150 per cent. Suitable materials are used throughout. We have found the use of chrome nickel steel alloy suitable for the scraper cage; nickel bronze alloy suitable for the scrapers; nickel suitable for the freezing cylinder, and chrome nickel steel alloy suitable for the stirrer.

The entire dasher assembly, including the scraper cage 4b and the reaction stirrer 117 may be removed as a unit from the freezing cylinder by loosening and swinging open the front head 113 of the freezing cylinder, leaving the entire front of the freezing cylinder open. This front head is mounted to swing open about a hinge 143 (Figs. 1 and 3) and is clamped in place by means of a plurality of bolts pivotally mounted on the front head and provided with wing nuts 144 for clamping the head in fluid-tight engagement with the shell of the freezing cylinder. These bolts may be swung into and out of notches in the laterally-extending ears 145 on the front head.

*Operation and controls*

Before starting, the ammonia valve 109 should be closed, the air valve 149 on the instrument board is set to "off" position, the mix supply valve 16 is set to open position, the recirculation valve 14 is set to recirculation position, the hand wheels 6 and 7 are set to give the desired capacity and overrun, the inspection plug 146 (Figs. 1 and 2) in the front of the freezing cylinder is removed to enable the operator to determine when a proper amount of mix has been supplied to the freezing cylinder, and the pump motor switch 147 (Figs. 1 and 3) is operated to set the pumps in operation. When the proper amount of mixture has been fed into the freezing cylinder, as determined by inspection through the inspection opening, the plug closing this opening is inserted and screwed tightly into place and the switch 148 controlling the motor 4a is operated to start the operation of the dasher and air compressor. Prior to this, the proper adjustments for air and ammonia have been made. The adjustments for the air include the setting of the air pressure regulator valve 63 to supply air at the desired pressure to the freezing chamber, the opening of the air valve 149 to the pipe 75 and the opening of the valve 64 at the inlet to the freezing cylinder. The adjustments for the ammonia system include the opening of the valve 108 to the ammonia pressure gauge, the adjustment of the ammonia gas pressure regulator valve 83 and the opening of the hand-operated shut-off valve 109. During the initial operation of the dasher, the recirculation valve 14 is left in recirculation position and the feed supply valve 16 is placed in closed position. With this setting, the mix is recirculated through the freezing cylinder and refrigerated, agitated and stirred until the resulting mixture is of the desired consistency. When this condition is reached, the mix supply valve 16 is moved to open position and the recirculation valve 14 is moved to a position to deliver the material from the freezing cylinder to the pipe 15 from whence it is supplied to suitable containers, or the like.

Further modifications will be apparent to those skilled in the art and it is desired, therefore, that the invention be limited only by the prior art and the scope of the appended claims.

Having thus described our invention, what we claim and desire to secure by Letters Patent is:

1. Apparatus for agitating and congealing a liquid to produce a plastic mass comprising a congealing chamber having an inlet opening for the supply of liquid and a delivery opening for the plastic mass, means for maintaining a congealing temperature in said chamber, means for causing a continuous supply of liquid to the chamber through the inlet opening and simultaneous continuous delivery of the material through the delivery opening, and selective means whereby the material from the delivery opening may be redelivered to the congealing chamber to be recirculated therethrough.

2. Apparatus for agitating and congealing a liquid to produce a plastic mass comprising a congealing chamber having an inlet opening for the supply of liquid and a delivery opening for the plastic mass, means for maintaining a congealing temperature in said chamber, means for causing a continuous supply of liquid to the chamber through the inlet opening and simultaneous continuous delivery of the material through the delivery opening, selective means whereby the material from the delivery opening may be redelivered to the congealing chamber to be recirculated therethrough or discharged as desired, and means whereby the supply of liquid to the congealing chamber may be discontinued during the period of recirculation.

3. Apparatus for agitating and congealing a liquid to produce a plastic mass comprising a congealing chamber having an inlet opening for the supply of liquid and a delivery opening for the plastic mass, means for maintaining a congealing temperature in said chamber, means for causing a continuous supply of liquid to the chamber through the inlet opening and simultaneous continuous delivery of the material through the delivery opening, selective means whereby the material from the delivery opening may be redelivered to the congealing chamber to be recirculated therethrough or discharged as desired, and means for maintaining a supply of gas under pressure in said congealing chamber.

4. Apparatus for agitating and congealing a liquid to produce a plastic mass comprising a congealing chamber having an inlet opening for the supply of liquid and a delivery opening for the plastic mass, means for maintaining a congealing temperature in said chamber, means for causing a continuous supply of liquid to the chamber through the inlet opening and simultaneous continuous delivery of the material through the delivery opening, said liquid supply means comprising a pump and a conduit leading from the pump to the congealing chamber, and selective means whereby the material from the delivery opening may be redelivered to said conduit to be recirculated through the congealing chamber or discharged as desired.

5. Apparatus for agitating and congealing a liquid to produce a plastic mass comprising a congealing chamber having an inlet opening for the supply of liquid and a delivery opening for the plastic mass, means for maintaining a congealing temperature in said chamber, means for causing a continuous supply of liquid to the chamber through the inlet opening and simultaneous continuous delivery of the material through the delivery opening, said liquid supply means comprising a pump and a conduit leading from the pump to the congealing chamber, selective means whereby the material from the delivery opening may be redelivered to said conduit to be recirculated through the congealing chamber or discharged as desired, and means whereby the supply of liquid to the congealing chamber may be discontinued during the period of recirculation.

6. Apparatus for congealing and agitating material to produce a plastic mass comprising a congealing cylinder, having a substantially horizontal axis for receiving the material to be congealed, means for maintaining a congealing temperature in said chamber, means in said cylinder for removing the congealed material from the wall of said cylinder, means for effecting relative rotation between said cylinder and material-removing means, and means for agitating the material in the cylinder comprising a stirrer freely rotatable about an axis substantially parallel to the axis of the cylinder and offset with respect to the cylinder axis and actuated by the movement of the material in the cylinder.

7. Apparatus for congealing and agitating material to produce a plastic mass comprising a horizontal congealing cylinder, having a substantially horizontal axis, for receiving the material to be congealed, means for maintaining a congealing temperature in said cylinder, means in said cylinder for removing the congealed material from the wall of said cylinder, means for effecting relative rotation between said cylinder and material-removing means, and means for agitating the material in the cylinder comprising a stirrer freely rotatable about an axis offset with respect to the cylinder axis and extending longitudinally of the axis of the cylinder and actuated by the movement of the material in the cylinder.

8. Apparatus for congealing a liquid and agitating and breaking up the congealed product into a plastic mass comprising a substantially horizontal congealing cylinder, a refrigerant chamber surrounding said congealing cylinder, means for maintaining a supply of liquid refrigerant at a definite level in said refrigerant chamber, and a dome extending upwardly from said refrigerant chamber above the liquid level in said chamber to receive the refrigerant when gasified, said dome being in substantially unrestricted communication with the upper side of said refrigerant chamber, said level maintaining means comprising a float valve controlling the inflow of liquid refrigerant and a float for said valve in said dome.

9. Apparatus for congealing a liquid and agitating and breaking up the congealed product into a plastic mass comprising a substantially horizontal congealing cylinder, a refrigerant chamber surrounding said congealing cylinder, means for maintaining a supply of liquid refrigerant at a definite level in said refrigerant chamber, a dome extending upwardly from said refrigerant chamber above the liquid level in said chamber to receive the refrigerant when gasified, said dome being in substantially unrestricted communication with the upper side of said refrigerant chamber, said level maintaining means comprising a float valve controlling the inflow of liquid refrigerant and a float for said valve in said dome, and a housing in said dome surrounding said float and spaced therefrom to prevent violent surging of said float.

10. Apparatus for congealing a liquid and agitating and breaking up the congealed product into a plastic mass comprising a substantially horizontal congealing cylinder, a refrigerant chamber surrounding said congealing cylinder, means for maintaining a supply of liquid refrigerant at a definite level in said refrigerant chamber, a dome extending upwardly from said refrigerant chamber above the liquid level in said chamber to receive the refrigerant when gasified, said level maintaining means comprising a float valve controlling the inflow of liquid refrigerant and a float for said valve in said dome, and a housing in said dome surrounding said float and spaced therefrom to prevent violent surging of said float to which housing the flow of liquid refrigerant from the float valve is delivered, said housing having provisions for delivering the liquid refrigerant to the refrigerant chamber and for enabling the escape of the gasified refrigerant to the upper part of the dome.

11. Apparatus for congealing a liquid and agitating and breaking up the congealed product into a plastic mass comprising a substantially horizontal congealing cylinder, a refrigerant chamber surrounding said congealing cylinder, and a chamber extending downwardly from the lower side of said refrigerant chamber to provide an oil sump for collecting any oil present in the refrigerant, and a chamber surrounding said oil sump to which a heating fluid may be supplied for thawing out the apparatus in case of a freeze-up.

12. Apparatus for agitating and congealing a liquid to produce a plastic mass comprising a congealing chamber, variable speed supply means for supplying liquid to the congealing chamber, means for maintaining a congealing temperature in said chamber, variable speed means for regulating the delivery of the plastic mass from the congealing chamber, a motor for driving said supply means and delivery regulating means, and means for controlling the speed of said supply means and delivery regulating means comprising manually operable means whereby the speed ratio both of the supply means and of the delivery regulating means with respect to the motor may be varied without changing the speed ratio of the delivery regulating means with respect to the supply means, and manually operable means whereby the speed ratio of the delivery regulating means with respect to the supply means may be varied.

13. Apparatus for agitating and congealing a liquid to produce a plastic mass and incorporating a gas in the plastic, congealed mass, comprising a congealing chamber, means for maintaining a congealing temperature in said chamber, variable speed supply means for supplying liquid to the congealing chamber, variable speed means for regulating the delivery of the plastic mass from the congealing chamber, means for supplying gas to said chamber, a motor for driving said supply means and delivery regulating means, and means for controlling the speed of said supply means and delivery regulating means comprising manually operable means whereby the speed ratio both of the supply means and of the delivery regulating means with respect to the motor may be varied without changing the speed ratio of the delivery regulating means with respect to the supply means, and manually operable means whereby the speed ratio of the delivery regulating means with respect to the supply means may be varied.

14. Apparatus for agitating and congealing a liquid to produce a plastic mass comprising a congealing chamber having an inlet opening for the supply of liquid and a delivery opening for the plastic mass, means for maintaining a congealing temperature in said chamber, force feed means for causing a continuous metered supply of liquid to the chamber through the inlet opening at a definite constant rate and force feed means for causing simultaneous continuous metered delivery of the material through the delivery opening at a definite constant rate, means for maintaining a supply of gas under pressure in said congealing chamber, and manually adjustable means for controlling the pressure of gas in the congealing cylinder to control the percentage of overrun.

15. Apparatus for congealing and agitating material to produce a plastic mass comprising a congealing cylinder for receiving material to be congealed, a scraper having scraper blades for removing the congealed material from the wall of the cylinder, means for effecting relative rotation between said cylinder and scraper, said cylinder having a discharge opening, means for exerting fluid pressure on the material within the cylinder to cause it to flow toward said discharge opening, and stirrer means actuated by the material being treated operating within the cylindrical space inside the scraper blades for forcing the material within said cylindrical space toward the axis of the cylinder to prevent the formation of strata of different degrees of fluidity.

16. Apparatus for congealing and agitating material to produce a plastic mass comprising a substantially horizontal congealing cylinder for receiving the material to be congealed, a scraper rotatable about the axis of said cylinder having circumferentially spaced scraper blades for removing the material from the wall of the cylinder, means for rotating said scraper, said cylinder having a discharge opening, means for exerting fluid pressure on the material within the cylinder to cause it to flow toward said discharge opening, and stirrer means actuated by the material being treated operating within the orbit of the scraper blades and rotatable about an axis extending longitudinally of the axis of the cylinder for forcing the material within the orbit of the scraper blades toward the axis of the cylinder to prevent formation of strata of different degrees of fluidity.

17. Apparatus for congealing and agitating material to produce a plastic mass comprising a substantially horizontal congealing cylinder for receiving the material to be congealed, a scraper rotatable about the axis of said cylinder having circumferentially spaced scraper blades for removing the material from the wall of the cylinder, means for rotating said scraper, said cylinder having a discharge opening, means for exerting fluid pressure on the material within the cylinder to cause it to flow toward said discharge opening, and stirrer means operating within the orbit of the scraper blades and rotatable about an axis extending longitudinally of the axis of the cylinder for forcing the material within the orbit of the scraper blades toward the axis of the cylinder to prevent formation of strata of different degrees of fluidity, the axis of said stirrer means being offset with respect to the axis of said cylinder.

18. Apparatus for congealing and agitating material to produce a plastic mass comprising a substantially horizontal congealing cylinder for receiving the material to be congealed, a scraper rotatable about the axis of said cylinder having circumferentially spaced scraper blades for removing the material from the wall of the cylinder, means for rotating said scraper, said cylinder having a discharge opening, means for exerting fluid pressure on the material within the cylinder to cause it to flow toward said discharge opening, and stirrer means operating within the orbit of the scraper blades and rotatable about an axis extending longitudinally of the axis of the cylinder for forcing the material within the orbit of the scraper blades toward the axis of the cylinder to prevent formation of strata of different degrees of fluidity, said stirrer means comprising a plurality of circumferentially spaced stirrer bars extending longitudinally of the axis of the cylinder.

19. Apparatus for congealing and agitating material to produce a plastic mass comprising a substantially horizontal congealing cylinder for receiving the material to be congealed, a scraper rotatable about the axis of said cylinder having circumferentially spaced scraper blades for removing the material from the wall of the cylinder, means for rotating said scraper, said cylinder having a discharge opening, means for exerting fluid pressure on the material within the cylinder to cause it to flow toward said discharge opening, and stirrer means operating within the orbit of the scraper blades and rotatable about an axis extending longitudinally of the axis of the cylinder for agitating the material within the orbit of the scraper blades to prevent formation of strata of different degrees of fluidity, the axis of said stirrer means being offset with respect to the axis of said cylinder, said stirrer means comprising a plurality of circumferentially spaced stirrer bars extending longitudinally of the axis of the cylinder.

20. Apparatus for congealing and agitating material to produce a plastic mass comprising a substantially horizontal congealing cylinder for receiving the material to be congealed, a scraper rotatable about the axis of said cylinder having circumferentially spaced scraper blades for removing the material from the wall of the cylinder, means for rotating said scraper, said cylinder having a discharge opening, means for exerting fluid pressure on the material within the cylinder to cause it to flow toward said discharge opening, and stirrer means operating within the orbit of the scraper blades and rotatable about an axis extending longitudinally of the axis of the cylinder for agitating the material within the orbit of the scraper blades to prevent formation of strata of different degrees of fluidity, said stirrer means being actuated by the movement of the material within the cylinder.

21. Apparatus for congealing and agitating material to produce a plastic mass comprising a substantially horizontal congealing cylinder for receiving the material to be congealed, a scraper rotatable about the axis of said cylinder having circumferentially spaced scraper blades for removing the material from the wall of the cylinder, means for rotating said scraper, said cylinder having a discharge opening, means for exerting fluid pressure on the material within the cylinder to cause it to flow toward said discharge opening, and stirrer means operating within the orbit of the scraper blades and rotatable about an axis extending longitudinally of the axis of the cylinder for agitating the material within the orbit of the scraper blades to prevent formation of strata of different degrees of fluidity, said stirrer means comprising a plurality of circumferentially spaced stirrer bars extending longitudinally of the axis of the cylinder, said stirrer means being actuated by the movement of the material within the cylinder.

22. Apparatus for congealing and agitating material to produce a plastic mass comprising a congealing cylinder for receiving the material to be congealed, a scraper having blades for removing the material from the wall of the cylinder, means for effecting relative rotation between said cylinder and scraper, said cylinder having a discharge opening, means for exerting pressure on the material within the cylinder to cause it to flow toward said discharge opening, and stirrer means actuated by the material being treated operating in the cylindrical space inside the scraper blades for forcing the material within said cylindrical space toward the axis of the cylinder to prevent formation of strata of different degrees of fluidity.

23. Apparatus for congealing and agitating material to produce a plastic mass comprising a congealing cylinder for receiving the material to be congealed, a scraper having blades for removing the material from the wall of the cylinder, means for effecting relative rotation between said cylinder and scraper, said cylinder having a discharge opening, means for exerting pressure on the material within the cylinder to cause it to flow toward said discharge opening, stirrer means operating in the cylindrical space inside the scraper blades for forcing the material within said cylindrical space toward the axis of the cylinder to prevent formation of strata of different degrees of fluidity, a metering supply pump for supplying liquid to the congealing cylinder, and a metering delivery regulating pump for regulating the delivery of the plastic mass from the congealing cylinder.

24. Apparatus for congealing and agitating material to produce a plastic mass comprising a substantially horizontal congealing cylinder for receiving the material to be congealed, a scraper rotatable about the axis of said cylinder having circumferentially spaced scraper blades for removing the material from the wall of the cylinder, means for rotating said scraper, said cylinder having a discharge opening, means for exerting fluid pressure on the material within the cylinder to cause it to flow toward said discharge opening, stirrer means operating within the orbit of the scraper blades and rotatable about an axis extending longitudinally of the axis of the cylinder for forcing the material within the orbit of the scraper blades toward the axis of the cylinder to prevent formation of strata of different degress of fluidity, a metering supply pump for supplying liquid to the congealing cylinder, and a metering delivery regulating pump for regulating the delivery of the plastic mass from the congealing cylinder.

25. Apparatus for congealing and agitating material to produce a plastic mass comprising a substantially horizontal congealing cylinder for receiving the material to be congealed, a scraper rotatable about the axis of said cylinder having circumferentially spaced scraper blades for removing the material from the wall of the cylinder, means for rotating said scraper, said cylinder having a discharge opening, means for exerting fluid pressure on the material within the cylinder to cause it to flow toward said discharge opening, stirrer means operating within the orbit of the scraper blades and rotatable about an axis extending longitudinally of the axis of the cylinder for agitating the material within the orbit of the scraper blades to prevent formation of strata of different degrees of fluidity, the axis of said stirrer means being offset with respect to the axis of said cylinder, a metering supply pump for supplying liquid to the congealing cylinder, and a metering delivery regulating pump for regulating the delivery of the plastic mass from the congealing cylinder.

26. Apparatus for congealing and agitating material to produce a plastic mass comprising a congealing cylinder for receiving material to be congealed, a scraper having scraper blades for removing the congealed material from the wall of the cylinder, means for effecting relative rotation between said cylinder and scraper, and stirrer means rotatable about an axis offset and extending longitudinally with respect to the axis of said cylinder for stirring the material within the cylindrical space inside said scraper blades, the axis of said cylinder extending within the outer orbit of said stirrer means.

27. Apparatus for congealing and agitating material to produce a plastic mass comprising a congealing cylinder for receiving material to be congealed, a scraper having scraper blades for removing the congealed material from the wall of the cylinder, means for effecting relative rotation between said cylinder and scraper, and stirrer means rotatable about an axis offset and extending longitudinally with respect to the axis of said cylinder for stirring the material within the cylindrical space inside said scraper blades, the axis of said cylinder extending within the outer orbit of said stirrer means, said stirrer means comprising a plurality of stirrer bars extending longitudinally of the axis of said cylinder.

28. Apparatus for congealing and agitating material to produce a plastic mass comprising a congealing cylinder for receiving the material to be congealed, a scraper having blades for removing the material from the wall of the cylinder, means for effecting relative rotation between said cylinder and scraper, said cylinder having a discharge opening, means for exerting pressure on the material within the cylinder to cause it to flow toward said discharge opening, and stirrer means operating in the cylindrical space inside the scraper blades for agitating the material within said cylindrical space to prevent formation of strata of different degrees of fluidity, said stirrer means being rotatable about an axis offset and extending longitudinally with respect to the axis of said cylinder, the axis of said cylinder extending within the outer orbit of said stirrer means.

29. Apparatus for agitating a liquid, mixing therewith a gas and congealing the liquid to produce a plastic mass having gas incorporated therein, comprising a congealing chamber, means for supplying gas to said chamber and maintaining a definite constant pressure of the gas in said chamber, positive force feed supply means for positively forcing a liquid at a constant definite metered volume rate into said chamber against the gas pressure in said chamber, means for mixing the gas in the chamber with the material forced into the chamber by the liquid forcing means, means for maintaining a congealing temperature in said chamber, and positive force feed delivery means for causing the delivery of the plastic mass from said chamber at a constant definite metered volume rate.

30. Apparatus for agitating a liquid, mixing therewith a gas and congealing the liquid to produce a plastic mass having gas incorporated therein, comprising a congealing chamber, means for supplying gas to said chamber and maintaining a definite constant pressure of the gas in said chamber, positive force feed supply means for positively forcing a liquid at a constant definite metered volume rate into said chamber against the gas pressure in said chamber, means for mixing the gas in the chamber with the material forced into the chamber by the liquid forcing means, means for maintaining a congealing temperature in said chamber, and positive force feed delivery means for causing the delivery of the plastic mass from said chamber at a constant definite metered volume rate, and means for maintaining a definite constant speed ratio between the speed of said metering supply means and the speed of said metering delivery means.

31. Apparatus for agitating a liquid, mixing therewith a gas and congealing the liquid to produce a plastic mass having gas incorporated therein, comprising a congealing chamber, a gas compressor for supplying gas to said congealing chamber, a relief valve for relieving the gas pressure in the line between the compressor and congealing chamber, a pressure regulating valve in the line between the relief valve and the congealing chamber for maintaining a definite fixed pressure of the gas in the congealing chamber, positive force feed supply means for positively forcing a liquid at a constant definite metered volume rate into said chamber against the gas pressure in said chamber, means for mixing the gas in the chamber with the material forced into the chamber by the liquid forcing means, means for maintaining a congealing temperature in said chamber, and positive force feed delivery means for causing the delivery of the plastic mass from said chamber at a constant definite metered volume rate.

32. Apparatus for agitating a liquid, mixing therewith a gas and congealing the liquid to produce a plastic mass having gas incorporated therein, comprising a congealing chamber, means for supplying gas to said chamber and maintaining a definite constant pressure of the gas in said chamber, positive force feed supply means for positively forcing a liquid at a constant definite metered volume rate into said chamber against the gas pressure in said chamber, means for mixing the gas in the chamber with the material forced into the chamber by the liquid forcing means, means for maintaining a congealing temperature in said chamber, and positive force feed delivery means for causing the delivery of the plastic mass from said chamber at a constant definite metered volume rate, and means for maintaining a definite constant speed ratio between the speed of said metering supply means and the speed of said metering delivery means, and manually controllable means for changing the speed ratio maintained by said speed ratio maintaining means.

33. Apparatus for agitating a liquid, mixing therewith a gas and congealing the liquid to produce a plastic mass having gas incorporated therein, comprising a congealing chamber, means for supplying gas to said chamber and maintaining a definite constant pressure of the gas in said chamber, positive force feed supply means for positively forcing a liquid at a constant definite metered volume rate into said chamber against the gas pressure in said chamber, means for mixing the gas in the chamber with the material forced into the chamber by the liquid forcing means, means for maintaining a congealing temperature in said chamber, and positive force feed delivery means for causing the delivery of the plastic mass from said chamber at a constant definite metered volume rate, and means for maintaining a definite constant speed ratio between the speed of said metering supply means and the speed of said metering delivery means, and manually controllable means for changing the gas pressure maintained by said pressure maintaining means.

34. Apparatus for agitating a liquid, mixing therewith a gas and congealing the liquid to produce a plastic mass having gas incorporated therein, comprising a congealing chamber, means for supplying gas to said chamber and maintaining a definite constant pressure of the gas in said chamber, positive force feed supply means for positively forcing a liquid at a constant definite metered volume rate into said chamber against the gas pressure in said chamber, means for mixing the gas in the chamber with the material forced into the chamber by the liquid forcing means, means for maintaining a congealing temperature in said chamber, and positive force feed delivery means for causing the delivery of the plastic mass from said chamber at a constant definite metered volume rate, and means for maintaining a definite constant speed ratio between the speed of said metering supply means and the speed of said metering delivery means, and manually controllable means for changing the speed ratio maintained by said speed ratio maintaining means, and manually controllable means for changing the gas pressure maintained by said pressure maintaining means.

35. Apparatus for agitating a liquid, mixing therewith a gas and congealing the liquid to produce a plastic mass having gas incorporated therein, comprising a congealing chamber, positive force feed supply means for positively forcing a liquid at a constant definite metered volume rate into said chamber against the gas pressure in said chamber, means for mixing the gas in the chamber with the material forced into the chamber by the liquid forcing means, means for maintaining a congealing temperature in said chamber, and positive force feed delivery means for causing the delivery of the plastic mass from said chamber at a constant definite metered volume rate, means for maintaining a definite constant speed ratio between the speed of said metering supply means and the speed of said metering delivery means, a gas compressor for supplying gas to said congealing chamber, and a pressure regulating valve in the line between the compressor and the congealing chamber for maintaining a definite constant pressure of the gas in the congealing chamber.

36. Apparatus for agitating a liquid, mixing therewith a gas and congealing the liquid to produce a plastic mass having gas incorporated therein, comprising a congealing chamber, means for supplying gas to said chamber and maintaining a definite constant pressure of the gas in said chamber, positive force feed supply means for positively forcing a liquid at a constant definite metered volume rate into said chamber against the gas pressure in said chamber, means for mixing the gas in the chamber with the material forced into the chamber by the liquid forcing means, means for maintaining a congealing temperature in said chamber, and positive force feed delivery means for causing the delivery of the plastic mass from said chamber at a constant definite metered volume rate, and means for maintaining a definite constant speed ratio between the rate of volume supplied by said metering supply means and the rate of volume delivered by said metering delivery means.

37. Apparatus for agitating a liquid, mixing therewith a gas and congealing the liquid to produce a plastic mass having gas incorporated therein, comprising a congealing chamber, means for supplying gas to said chamber and maintaining a definite constant pressure of the gas in said chamber, positive force feed supply means for positively forcing a liquid at a constant definite metered volume rate into said chamber against the gas pressure in said chamber, means for mixing the gas in the chamber with the material forced into the chamber by the liquid forcing means, means for maintaining a congealing temperature in said chamber, and positive force feed delivery means for causing the delivery of the plastic mass from said chamber at a constant definite metered volume rate, and means for maintaining a definite constant speed ratio between the rate of volume supplied by said metering supply means and the rate of volume delivered by said metering delivery means, and manually controllable means for changing the speed ratio maintained by said speed ratio maintaining means.

38. Apparatus for agitating a liquid, mixing therewith a gas and congealing the liquid to produce a plastic mass having gas incorporated therein, comprising a congealing chamber, means for supplying gas to said chamber and maintaining a definite constant pressure of the gas in said chamber, positive force feed supply means for positively forcing a liquid at a constant definite metered volume rate into said chamber against the gas pressure in said chamber, means for mixing the gas in the chamber with the material forced into the chamber by the liquid forcing means, means for maintaining a congealing temperature in said chamber, and positive force feed delivery means for causing the delivery of the plastic mass from said chamber at a constant definite metered volume rate, and means for maintaining a definite constant speed ratio between the speed of said metering supply means and the speed of said metering delivery means, transmission means acting between said supply and delivery means for maintaining a definite constant speed ratio between the speed of said metering supply means and the speed of said metering delivery means.

39. Apparatus for agitating a liquid, mixing therewith a gas and congealing the liquid to produce a plastic mass having gas incorporated therein, comprising a congealing chamber, means for supplying gas to said chamber and maintaining a definite constant pressure of the gas in said chamber, positive force feed supply means for positively forcing a liquid at a constant definite metered volume rate into said chamber against the gas pressure in said chamber, means for mixing the gas in the chamber with the material forced into the chamber by the liquid forcing means, means for maintaining a congealing temperature in said chamber, and positive force feed delivery means for causing the delivery of the plastic mass from said chamber at a constant definite metered volume rate, and means for maintaining a definite constant speed ratio between the speed of said metering supply means and the speed of said metering delivery means, and manually controllable means for changing the gas pressure maintained by said pressure maintaining means.

40. Apparatus for agitating a liquid, mixing therewith a gas and congealing the liquid to produce a plastic mass having gas incorporated therein, comprising a congealing chamber, means for supplying gas to said chamber and maintaining a definite constant pressure of the gas in said chamber, positive force feed supply means for positively forcing a liquid at a constant definite metered volume rate into said chamber against the gas pressure in said chamber, means for mixing the gas in the chamber with the material forced into the chamber by the liquid forcing means, means for maintaining a congealing temperature in said chamber, and positive force feed delivery means for causing the delivery of the plastic mass from said chamber at a constant definite metered volume rate, and means for maintaining a definite constant speed ratio between the speed of said metering supply means and the speed of said metering delivery means, for maintaining a definite constant rate of the volume supplied by said metering supply means and a definite constant rate of the volume delivered by said metering delivery means.

41. Apparatus for congealing and agitating material to produce a plastic mass, comprising a congealing cylinder for receiving the material to be congealed, a scraper rotatable about the axis of said cylinder having circumferentially spaced scraper blades for removing the material from the wall of the cylinder, means for rotating said scraper, said cylinder having a head at the entrance end of the cylinder, said scraper having a head having a surface extending across the major portion of the cross section of said cylinder adjacent said cylinder head to provide a relatively thin space between said heads and means for introducing liquid and gas through said cylindrical head into said thin space between the heads adjacent the rotating head of the scraper to give distribution to the liquid and gas.

42. Apparatus for congealing and agitating material to produce a plastic mass, comprising a congealing cylinder for receiving the material to be congealed, a scraper rotatable about the axis of said cylinder having circumferentially spaced scraper blades for removing the material from the wall of the cylinder, means for rotating said scraper, said cylinder having a head at the entrance end of the cylinder, said scraper having a head adjacent said cylinder head to provide a relatively thin space between said heads and means for introducing liquid and gas through said cylindrical head into said thin space between the heads adjacent the rotating head of the scraper to give distribution to the liquid and gas, said scraper head having a scraper blade secured thereto, operating in said thin space between the heads to prevent congealed material from adhering to the cylinder head and to give distribution to the gas and liquid.

43. In apparatus for continually chilling and agitating material to change the condition thereof comprising a refrigerated cylinder having a power-operated scraper mechanism rotatable adjacent the inner wall thereof, and agitating means within said scraper mechanism and actuated by the material being treated to cause cross currents in the cylinder tending to prevent the formation of axially disposed strata having different degrees of fluidity.

44. In apparatus for continuously chilling and agitating material to alter the condition thereof, the combination with a refrigerated cylinder having a scraper mechanism rotatable adjacent the inner wall of said cylinder and having power means for operating said scraper mechanism, of movable agitating means independent of said power means and said scraper mechanism for mixing the material to be refrigerated.

45. In apparatus for continuously chilling and agitating material to alter the condition thereof, the combination of a refrigerated cylinder having a power-operated scraper mechanism rotatable adjacent the inner wall of said cylinder for the constant removal of material therefrom, of agitating means actuated by the material being treated occupying a portion of the space within said scraper mechanism and comprising a shaft extending longitudinally of the axis of said cylinder and a rotor disposed about said shaft and free to rotate thereon.

46. A continuous gas pressure ice cream freezer comprising a freezing chamber having a metal wall, means for supplying mix to said chamber and means for supplying air to said chamber comprising a metal tubular member extending through said metal wall, and a heat insulating sleeve surrounding said tubular member where it extends through said wall to prevent loss of heat from said tubular member to said wall and to prevent freezing of the gas in said tubular member.

47. An apparatus for refrigerating and intermingling ice cream mix and a gas to produce a plastic mass having said gas uniformly dispersed therethrough in controlled quantities comprising a refrigerated chamber, means for introducing the mix to said chamber at a definite volume rate, means for supplying gas to said chamber, automatic means for maintaining the gas in said chamber at a definite constant pressure, means for agitating and refrigerating the materials within said chamber, and means for positively discharging the materials from said chamber at a constant volume rate substantially higher than said rate of mix supply.

48. An apparatus for refrigerating and intermingling ice cream mix and a gas to produce a plastic mass having said gas uniformly dispersed therethrough in controlled quantities comprising a refrigerated chamber, means for introducing the mix to said chamber at a definite volume rate, means for supplying gas to said chamber, automatic means for maintaining the gas in said chamber at a definite constant pressure, manually operable adjusting means for securing different definite constant pressures in said gas chamber, means for agitating and refrigerating the materials within said chamber, and means for discharging the materials from said chamber at a constant volume rate substantially higher than said rate of mix supply.

49. Apparatus for congealing a liquid and agitating and breaking up the congealed product into a plastic mass comprising a substantially horizontal refrigerant chamber, a gas chamber above said refrigerant chamber, a pressure regulating valve for controlling the flow of gas from said chamber and maintaining the gas pressure in the chamber, means for supplying liquid refrigerant under pressure to said gas chamber and a float valve for maintaining the liquid level of the refrigerant below the level of the point of supply of the liquid refrigerant to said chamber, said gas chamber having common gas and liquid communication with the said refrigerant chamber whereby the liquid refrigerant supplied to said gas chamber will flow down into said refrigerant chamber and whereby the gas generated in said refrigerant chamber will flow upward into said gas chamber, said pressure regulating valve serving to maintain the gas pressure and temperature substantially constant, and shielding means in said gas chamber adjacent the entering stream of liquid to prevent particles of liquid from being carried up with the escaping gas, the float of said float valve operating in said shielding means.

50. An ice cream freezer comprising a horizontal freezing and mixing cylinder, a scraper cage operating in said cylinder for removing the frozen material from the walls of the cylinder, a beater cage operating in said scraper cage for agitating the material within the orbit of said scraper cage and a nonrotatable shaft extending longitudinally of said cylinder on which said beater cage is rotatably mounted, said beater cage having an agitating bar adjacent said shaft and extending longitudinally thereof for preventing frozen material from collecting on said shaft.

51. A scraper cage for removing the frozen material from the walls of a freezing and mixing cylinder comprising a supporting bar rotatable with said cage and extending longitudinally thereof adjacent the walls of said cylinder and a scraper blade mounted on said supporting bar, said blade and bar having a slide and slot connection with each other connectable and disconnectable by relative longitudinal movement of said blade and bar.

52. A scraper cage for removing the frozen material from the walls of a freezing and mixing cylinder comprising a supporting bar rotatable with said cage and extending longitudinally thereof adjacent the walls of said cylinder and a scraper blade mounted on said supporting bar, said blade and bar having a slide and slot connection with each other connectable and disconnectable by relative longitudinal movement of said blade and bar, said cage having a circular portion for supporting said blade, said blade lying outside said circular portion.

53. The combination with a freezing and mixing cylinder of a scraper cage for removing material from the walls of said cylinder, said cage having a supporting bar rotatable with said cage and extending longitudinally thereof adjacent the walls of said cylinder and a scraper blade mounted on said bar, said blade and bar having a slide and slot connection with each other connectable and disconnectable by relative longitudinal movement of said blade and bar, said blade being held in connected position by engagement of the end thereof with the end of said cylinder.

54. A scraper cage for removing the frozen material from the walls of a freezing and mixing cylinder comprising a supporting bar rotatable with said cage and extending longitudinally thereof adjacent the walls of said cylinder and a scraper blade mounted on said supporting bar, said blade and bar having a slide and slot connection with each other connectable and disconnectable by relative longitudinal movement of said blade and bar, said blade being held in connected position by engagement of the end thereof with the end of an adjacent blade.

55. A continuous process of controlling the relative proportions of air and mix in freezing ice cream or similar products requiring a relatively large proportion of air to mix, and requiring relatively accurate control of the amount of overrun which comprises continuously supplying the mix at a definite volume rate to a freezing chamber, continuously subjecting said mix in said chamber to a volume of air of constant pressure, continuously mixing and agitating the mix and air together in said chamber and simultaneously subjecting the same to the desired temperature change to freeze the same, and continuously and positively withdrawing the completed aerated product from said chamber at a definite volume rate greater than the original mix supply rate by the volume of air desired in the completed product.

56. Apparatus for intermingling a liquid and a gas to disperse uniformly said gas in said liquid comprising a mixing chamber, means for delivering the liquid to said chamber at a definite volume rate, means for supplying gas at superatmospheric pressure to said chamber, means for maintaining the gas in said chamber at a predetermined substantially constant pressure, means for agitating and mixing the liquid and the gas within said chamber, and means for positively discharging the mixture from said chamber at a definite volume rate substantially higher than the said rate of delivery of said liquid and said gas to said chamber.

57. Apparatus for intermingling a liquid and a gas to disperse uniformly the gas throughout the liquid in controlled quantities comprising a treating chamber, means for supplying gas to said chamber at a predetermined substantially constant superatmospheric pressure, positive force feed means for suppling the liquid at a positive controllable metered volume rate to said chamber against the gas pressure in said chamber, means for intermingling the gas and liquid in the chamber, positive force feed delivering means for causing the delivery of the intermingled product from said chamber at a controllable metered volume rate, and means for maintaining a definite constant speed ratio between the speed of said metering supply means and the speed of said metering delivery means.

58. Apparatus for intermingling a liquid and a gas to disperse uniformly the gas throughout the liquid in controlled quantities comprising a treating chamber, means for supplying gas to said chamber at a controllable predetermined superatmospheric pressure, positive force feed means for supplying liquid at a controllable metered volume rate into said chamber against the gas pressure in said chamber, means for intermingling the gas and liquid in the chamber, positive force feed delivering means for causing the delivery of the intermingled product from said chamber at a controllable metered volume rate, means for maintaining a predetermined speed ratio between the speed of said metering supply means and the speed of said metering delivery means, and controllable means for changing the speed ratio maintained by said speed ratio maintaining means.

59. An apparatus for refrigerating and intermingling ice cream mix and a gas to produce a plastic mass having said gas uniformly dispersed therethrough in controlled quantities comprising a refrigerated chamber, means for introducing the mix to said chamber at a definite volume rate, means for supplying gas to said chamber, means for agitating and refrigerating the materials within said chamber, and means for positively discharging the materials from said chamber at a constant volume rate substantially higher than said rate of mix supply.

JOSEPH H. GODFREY.
ARTHUR W. FARRALL.